(12) United States Patent
Parker

(10) Patent No.: US 9,593,783 B2
(45) Date of Patent: *Mar. 14, 2017

(54) AGGREGATE REPLACEMENT

(71) Applicant: Alton F. Parker, Clifton Park, NY (US)

(72) Inventor: Alton F. Parker, Clifton Park, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/864,546

(22) Filed: Sep. 24, 2015

(65) Prior Publication Data

US 2016/0010762 A1    Jan. 14, 2016

Related U.S. Application Data

(63) Continuation-in-part of application No. 14/282,801, filed on May 20, 2014, now Pat. No. 9,206,574,
(Continued)

(51) Int. Cl.
*E02B 11/00* (2006.01)
*F16L 1/06* (2006.01)
(Continued)

(52) U.S. Cl.
CPC .............. *F16L 1/06* (2013.01); *E02B 11/005* (2013.01); *E02D 31/02* (2013.01); *E02D 31/10* (2013.01);
(Continued)

(58) Field of Classification Search
CPC . E02B 11/00; E02B 11/005; F16L 1/11; E03F 1/002; E03F 1/005
(Continued)

(56) References Cited

U.S. PATENT DOCUMENTS 2,130,498 A * 9/1938 Klemschofski ....... E02B 11/005
106/677
3,220,194 A * 11/1965 Lienard ................ A01C 23/042
405/45
(Continued)

FOREIGN PATENT DOCUMENTS

KR    KR 101049061 B1 * 7/2011   ................ F16L 1/11

OTHER PUBLICATIONS

French drain, Wikipedia, last edited on Mar. 18, 2014: http://en.wikipedia.org/wiki/French_drain.
(Continued)

*Primary Examiner* — Frederick L Lagman
(74) *Attorney, Agent, or Firm* — Schmeiser, Olsen & Watts LLP

(57) ABSTRACT

An aggregate replacement device may be used to replace rock aggregate in underground drainage systems. An aggregate replacement includes a structure having a proximal face, a distal face, a bottom face and two side faces with a plurality of openings. The two side faces and bottom face have a proximal edge, a distal edge and two side edges. The proximal face and distal face are coupled to the proximal edges or distal edges of the two side faces and bottom face to form an obtuse angle. A first of the side edges of the side faces is coupled to the side edges of the bottom face. A coupler and a locking device are coupled to a second of the side edges of the side faces. The coupler and locking device couple the structure to a second structure with the second of the side edges of the side faces abutting.

17 Claims, 27 Drawing Sheets

Related U.S. Application Data which is a continuation-in-part of application No. 13/851,004, filed on Mar. 26, 2013, now Pat. No. 9,139,971.

(51) Int. Cl.

| | | |
|---|---|---|
| *F16L 1/036* | (2006.01) | |
| *F16L 3/08* | (2006.01) | |
| *E02D 31/10* | (2006.01) | |
| *E02D 31/02* | (2006.01) | |
| *E03F 1/00* | (2006.01) | |

(52) U.S. Cl.
CPC .............. *E03F 1/005* (2013.01); *F16L 1/036* (2013.01); *F16L 3/08* (2013.01)

(58) Field of Classification Search
USPC .......................... 405/43, 44, 45, 46, 50, 157
See application file for complete search history.

(56) References Cited

U.S. PATENT DOCUMENTS

| | | | | |
|---|---|---|---|---|
| 3,401,526 | A * | 9/1968 | Rodgers, III | E03F 1/003 405/45 |
| 4,183,484 | A | 1/1980 | Mathews | |
| 4,192,628 | A | 3/1980 | Gorman | |
| 4,588,325 | A | 5/1986 | Seefert | |
| 4,982,533 | A | 1/1991 | Florence | |
| 4,983,069 | A | 1/1991 | Florence | |
| 5,160,218 | A * | 11/1992 | Hill | F16L 1/24 405/157 |
| 5,437,424 | A | 8/1995 | Netz, Sr. | |
| 5,553,975 | A | 9/1996 | Elkins | |
| 5,605,419 | A | 2/1997 | Reinert, Sr. | |
| 5,639,364 | A | 6/1997 | Houck et al. | |
| 5,782,584 | A * | 7/1998 | Arthur | H02G 1/14 220/908 |
| 5,810,510 | A | 9/1998 | Urriola | |
| 6,273,641 | B1 * | 8/2001 | Bull | F16L 1/123 405/157 |
| 6,428,870 | B1 | 8/2002 | Bohnhoff | |
| 6,439,808 | B1 * | 8/2002 | Smidt | F16L 1/123 405/157 |
| 6,602,023 | B2 | 8/2003 | Crescenzi et al. | |
| 6,648,549 | B1 | 11/2003 | Urriola | |
| 6,779,946 | B1 | 8/2004 | Urriola et al. | |
| 7,300,226 | B1 * | 11/2007 | Maestro | E03F 1/003 405/43 |
| 7,413,381 | B1 | 8/2008 | Bracone, Jr. | |
| 7,517,172 | B2 | 4/2009 | Sipaila | |
| 7,591,610 | B2 | 9/2009 | Krichten et al. | |
| 7,621,695 | B2 | 11/2009 | Smith et al. | |
| 7,677,835 | B2 | 3/2010 | Oscar | |
| 7,712,997 | B2 | 5/2010 | Roelfsema | |
| 7,942,371 | B1 | 5/2011 | McCoy | |
| 8,177,457 | B2 * | 5/2012 | Boudreaux, Jr. | E02B 3/108 405/111 |
| 8,985,903 | B1 * | 3/2015 | Frith | F16L 57/00 405/157 |
| 2001/0039965 | A1 * | 11/2001 | Jensen | F16L 1/11 137/372 |
| 2003/0118404 | A1 * | 6/2003 | Lee | E02B 11/00 405/43 |
| 2005/0100410 | A1 * | 5/2005 | Maestro | E03F 1/003 405/46 |
| 2008/0166182 | A1 * | 7/2008 | Smith | E03F 1/005 405/36 |
| 2009/0080976 | A1 | 3/2009 | Anderlind et al. | |
| 2009/0279953 | A1 | 11/2009 | Allard et al. | |
| 2010/0021236 | A1 | 1/2010 | Kreikemeier | |
| 2010/0189514 | A1 | 7/2010 | Gunn et al. | |
| 2011/0044760 | A1 * | 2/2011 | Larach | E03F 1/005 405/52 |
| 2011/0204529 | A1 | 8/2011 | Kerkhoff et al. | |
| 2015/0260313 | A1 * | 9/2015 | Miskovich | F16L 1/11 405/157 |

OTHER PUBLICATIONS

Polypipe Polystorm Soakaway Crate, Drainageonline.co.uk, Accessed on May 19, 2014: http://www.drainageonline.co.uk/Soakaway-%26-Geotextiles/Polystorm-Soakaway-Crate.htm.
Soakaways, www.DrainageSales.com, Accessed on May 19, 2014: http://www.drainagepipe.co.uk/products/soakaways-155/.
Rainwater Harvesting Underground Water Tank (Re-use Tank), www.atlantiscorp.com.au, Accessed on May 19, 2014: http://www.atlantiscorp.com.au/solutions/landscaping/rainwater-harvesting.
Atlantis 30mm Flo-Cell® The Orginal Drainage Cell, www.drainagecell.com, Accessed on May 19, 2014: http://www.drainagecell.com/30mmflocell.html.
EZ Flow French Drain, www.ndspro.com, Accessed on May 20, 2014: http://www.ndspro.com/image-library/french-drains/ezflow-french-drain-gallery.
French Drains, www.MapleValleyTractorServices.com, Accessed on May 20, 2014: http://www.maplevalleytractorservices.com/id64.html.
French Drains, Ditches, and Swales; www.maggiesfarm.anotherdotcom.com, Accessed on May 20, 2014: http://maggiesfarm.anotherdotcom.com/archives/13979-French-Drains,-Ditches,-and-Swales.html.
All About French Drains, www.lisklandscape.com, Accessed on May 20, 2014: http://www.lisklandscape.com/landscaping-ideas/how-to-install-a-french-drain/.
Classic Drainage, Inc.; www.classicdrainage.com, Accessed on May 20, 2014: http://classicdrainage.com/.
Homeowner's Newsletter, www.homeinspectionnewsletter.blogspot.com, Accessed on May 20, 2014: http://homeinspection-newsletter.blogspot.com/2009/06/water-problems-and-solutions-under-your.html.
How to dig and install a French Drain to collect and move rain water away from your home, www.easydigging.com, Accessed on May 20, 2014: http://www.easydigging.com/Drainage/installation_french_drain.html.
Form-a-Drain, www.nitterhousemasonry.com, Accessed on May 20, 2014: http://www.nitterhousemasonry.com/products/form-a-drain/.
Polypipe Building Products, www.polypipe.com, Accessed on May 20, 2014: http://www.polypipe.com/building-products/.

\* cited by examiner

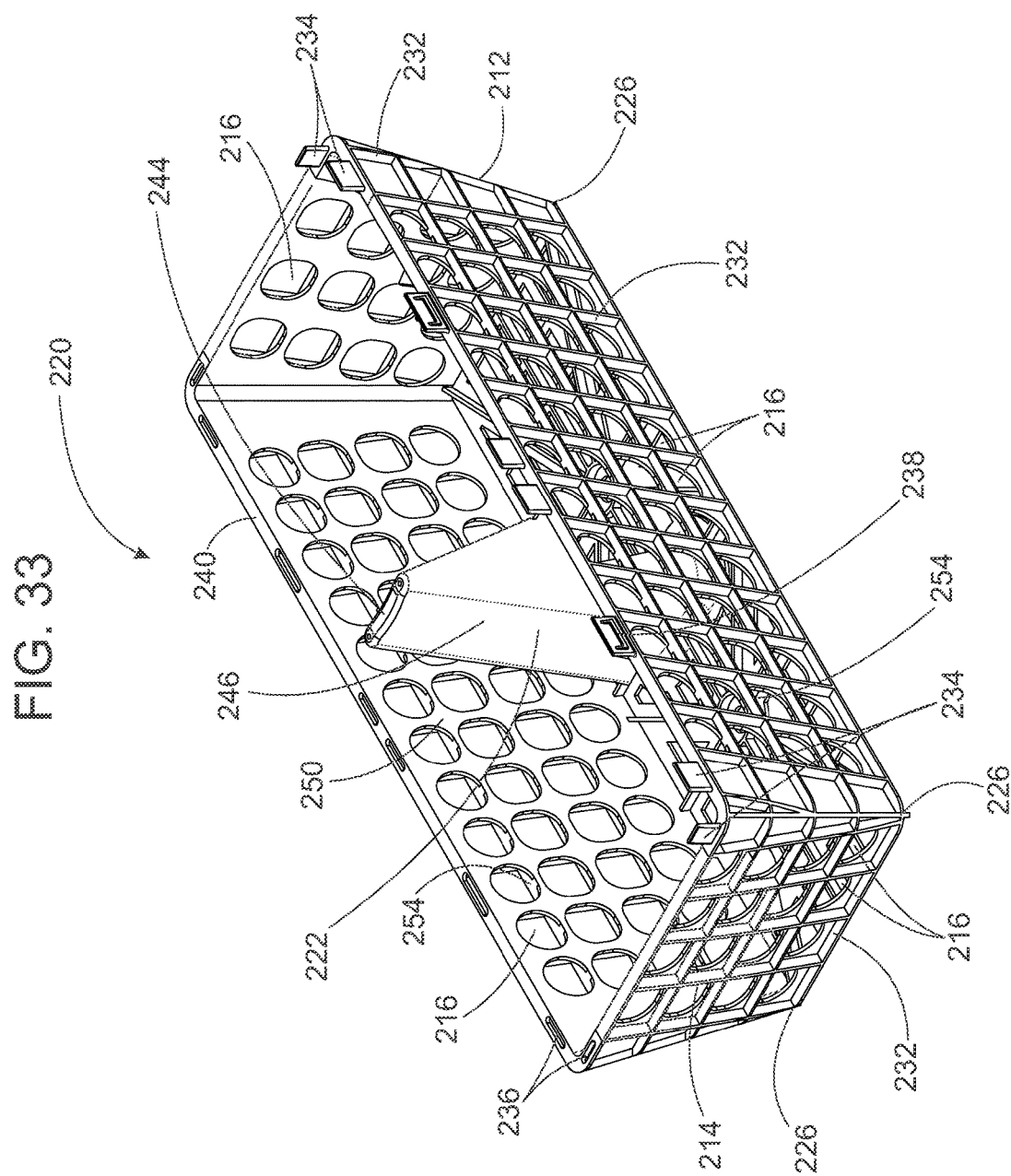

AGGREGATE REPLACEMENT

CROSS-REFERENCE TO RELATED APPLICATION

This application is a continuation-in-part of U.S. patent application Ser. No. 14/282,801 to Alton Parker entitled "AGGREGATE REPLACEMENT", filed May 20, 2014, now issued as U.S. Pat. No. 9,206,574, issued on Dec. 8, 2015, which is a continuation-in-part of issued U.S. Pat. No. 9,139,971 to Alton Parker entitled "AGGREGATE REPLACEMENT", the content of which are incorporated herein by reference.

BACKGROUND OF THE INVENTION

Technical Field

This invention relates to French drains and in particular to a device which can be used to replace the aggregate used in French drains or other water distribution systems.

Background Art

French drains are widely used in residential and commercial building applications to collect groundwater and distribute it away from the proximity of basements, foundations, footings, and similar surface and subterranean building structures where water may penetrate and/or damage these structures. An additional use of this technology is to deliver water into the sub-surface of the ground. For example, a French drain may be used to distribute fluid into the drain field of a residential septic system.

Various structures have been developed over the last two hundred years to accomplish this diversion of fluids. Generally, they consist of a pipe containing multiple small perforations throughout its sidewall through which water or fluid enters the pipe. The fluid then travels down the pipe to a desired location. To keep the perforations in the pipe from clogging, and to prevent dirt or other material from the surrounding substrate from entering the pipe, the pipe is laid within a bed of solid granular material that creates a porous aggregate unrestrictive to the flow of fluid, such as gravel, or a similar synthetic aggregate. Finally, a woven, coarse, landscape textile or filter fabric is used to surround and cover the aggregate to prevent the aggregate from becoming clogged with dirt or other surrounding substrate. The pipe, surrounding aggregate, and textile are typically installed within a trench which is then filled to grade level with dirt or other substrate. Rainwater or other surface water in the area seeps from the surrounding substrate through the textile where it may trickle freely through the aggregate into the pipe for removal from the area.

One significant problem with this system is the labor and expense necessary to surround the pipe with the aggregate. Also, if the aggregate is too heavy or is not placed carefully on top of the pipe, the pipe may break or collapse while the aggregate is being placed. This can cause time consuming and expensive problems.

Various inventions have been made in order to try and prevent these problems. For example, U.S. Pat. No. 5,810,509 issued to Nahlik, Jr. discloses a cell system for buried drainage pipes. These cells, however, cannot be used to form continuous French drains. Instead, there are individual cells that are spaced throughout the drainage area. These cells also do not protect the areas of pipe between the cells and therefore there may be a problem with these areas of pipe being damaged when the trench they are laid in is filled.

U.S. Pat. No. 7,191,802 issued to Koerner (hereinafter "Koerner") and U.S. Pat. No. 5,051,028 issued to Houck et al. (hereinafter "Houck"), also attempt to improve French drains by replacing the standard aggregate. They, however, do not allow the aggregate replacement and pipe to be easily assembled on site.

Instead Houck discloses units that are manufactured as one piece with sections of perforated pipe inside. Multiple units are hooked together. Therefore if a section of pipe becomes damaged, the entire unit must be replaced rather than just the pipe.

Koerner discloses a system where netting filled with aggregate is wrapped along a perforated pipe. This system takes too long to conveniently assemble on site and therefore will likely need to be preassembled. Therefore if the pipe gets damaged the entire assembly will need to be replaced rather than simply replacing the pipe.

Also, while these patents claim to protect the pipe, in reality they would provide very little protection to the pipe when the trench is being filled in with substrate.

Additionally, many of the systems in the prior art are expensive to ship and store as they are bulky and require considerable space.

Accordingly, what is needed is an aggregate replacement device that is light weight, easy to use, quick to install and which allows the pipe to be accessed and inserted after the aggregate replacement has been placed in the trench. Further, an aggregate replacement device which takes up very little space when it is being shipped or stored is also desirable.

DISCLOSURE OF THE INVENTION

The aggregate replacement device, as disclosed hereafter in this application, is strong, lightweight and easy to assemble.

In particular embodiments, an aggregate replacement device includes a structure with a proximal end, a distal end, and at least one face wherein the at least one face includes a plurality of first openings. A second opening in the structure extends from the proximal end to the distal end continuing uninterrupted through at least one of the at least one faces. The second opening is configured to receive at least one pipe inserted in a radial direction of the at least one pipe.

Additional embodiments of an aggregate replacement device may include a structure having a proximal end, a distal end, and at least one face that is water permeable. The aggregate replacement device may also include an opening in the at least one outer face that extends from the proximal end to the distal end of the structure continuously. The opening may be configured to receive at least one pipe inserted in a radial direction of the at least one pipe. The opening may further include at least one pipe retainer.

Other embodiments of an aggregate replacement device may include a structure having a proximal end, a distal end, and at least two faces. The at least two faces further contain a plurality of first openings. A stake may be coupled to the structure to secure the structure in a desired position. A concrete barrier may be placed abutting at least one of the at least two faces. An second opening in the structure may extend from the proximal end of the structure to the distal end of the structure continuing uninterrupted through at least one of the at least two faces. The second opening, however, continues through a different at least one of the at least two faces than the concrete barrier abuts. The second opening may be configured to receive at least one pipe inserted in a radial direction of the at least one pipe.

Further embodiments of an aggregate replacement device may include a structure having a proximal end, a distal end, and at least one face. The at least one face has a plurality of first openings. A second opening may be located in the proximal end. A third opening may also be located in the structure. A first end of a pipe is in communication with the second opening and the pipe extends through the structure. A second end of the pipe is in communication with the third opening.

Embodiments of an aggregate replacement device may also include a structure having a proximal end, a distal end, and at least one face. The at least one face may have a plurality of first openings. The proximal end may also comprise at least one cutout, wherein the at least one cutout intersects an edge of the proximal end.

Yet more embodiments of an aggregate replacement device may include at least one face, wherein the at least one face has a plurality of openings. At least one coupler may be coupled to the at least one face. At least one distal end and at least one proximal end may be hingedly coupled to at least one the at least one face.

Additional embodiments of an aggregate replacement device may include a section having a proximal end, a distal end and at least one face. A plurality of openings may be formed in the at least one face. The at least one face may have a proximal edge, a distal edge and two side edges. The proximal end may be coupled to the proximal edge of the at least one face forming an obtuse angle between the proximal end and the at least one face. The distal end may be coupled to the distal edge of the at least one face forming an obtuse angle between the distal end and the at least one face. The at least one coupler may be coupled to two of the two side edges of the at least one face for coupling the section to a second section.

Further embodiments of an aggregate replacement device may include at least one structure having a proximal face, a distal face, at least one additional face and a mating opening. A plurality of flow openings may be formed in the at least one additional face. The distal face may be coupled to a distal end of the at least one additional face and the proximal face may be coupled to a proximal end of the at least one additional face. The mating opening is formed between the proximal face and the distal face. A pipe support may be coupled to the at least one additional face at a location opposite the mating opening. The at least one structure is configured to couple to a second at least one structure. When the at least one structure is coupled to the second at least one structure, the mating opening of the at least one structure is adjacent the mating opening of the second at least one structure.

Other embodiments of an aggregate replacement device may include a structure having a proximal face, a distal face, a bottom face and two side faces. The two side faces and the bottom face have a plurality of openings. The two side faces and the bottom face each further include a proximal edge, a distal edge and two side edges. The proximal face is coupled to each of the proximal edges of the two side faces and the bottom face. The distal face is coupled to each of the distal edges of the two side faces and the bottom face. A first of the two side edges of each of the two side faces is coupled to one of the two side edges of the bottom face. At least one coupler is coupled to a second of the two side edges of each of the two side faces. At least one locking device is coupled to the second of the two side edges of each of the two side faces. The at least one coupler configured to couple the structure to a second structure with the second of the two side edges of each of the two side faces abutting on each of the structure and the second structure. The at least one locking device configured to lock the structure to the second structure.

The foregoing and other features and advantages of the aggregate replacement device will be apparent to those of ordinary skill in the art from the following more particular description of the invention and the accompanying drawings.

BRIEF DESCRIPTION OF THE DRAWINGS

The invention will hereinafter be described in conjunction with the appended drawings where like designations denote like elements, and:

FIG. 33 is an isometric view of a section of pipe-less aggregate replacement.

DESCRIPTION OF THE INVENTION

Figure 1:
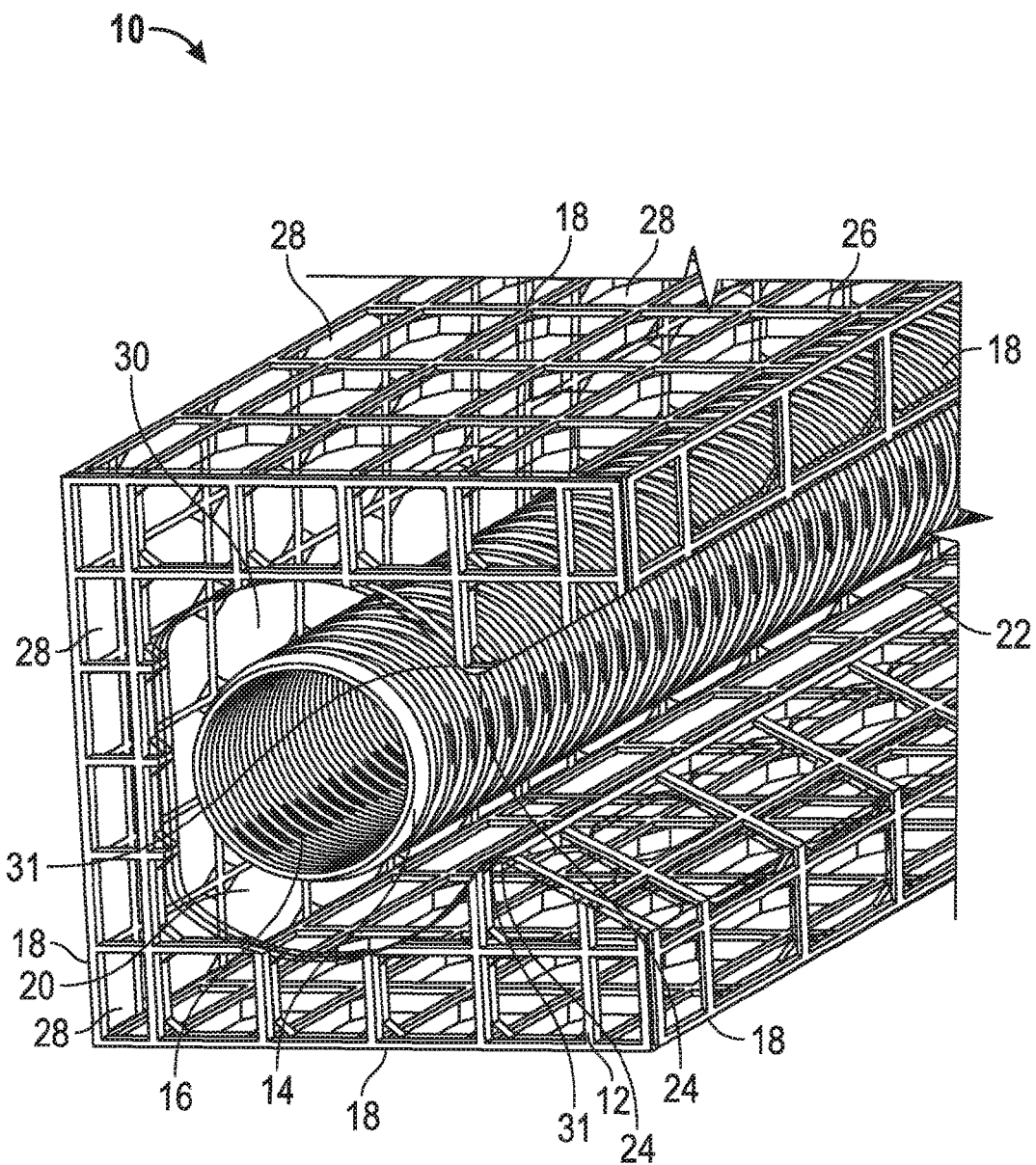
FIG. 1 is an isometric view of an aggregate replacement configured according to a first embodiment.

As discussed above, embodiments of the present invention relate to an aggregate replacement device for use in French drains and the like. In particular, disclosed is an aggregate replacement device including a structure with fluid permeable surfaces, and an opening configured to receive a pipe inserted parallel to a diameter of the pipe.

When French drains or other drainage or fluid distribution systems are set up, a trench is dug in the ground in the area where the water is to be drained from. The trench is then lined with a landscape, filter fabric or other water permeable material which prevents the soil or substrate from the surrounding area from entering the trench. Aggregate may then be placed in the bottom of the trench. This aggregate is typically washed gravel or a synthetic aggregate that allows water to flow freely through. A perforated pipe is then placed on top of the aggregate. The perforated pipe could also be placed directly on the filter fabric in the bottom of the trench. The perforated pipe is then covered with additional aggregate. The top of the additional aggregate may have more filter fabric placed on it. Then top soil and plants may be placed on the filter fabric hiding the French drain underground.

FIGS. 1-6 illustrate an aggregate replacement 10 configured according to embodiments of the present invention. The aggregate replacement 10 takes the place of the washed gravel or synthetic aggregate in a French drain or other water distribution system.

The aggregate replacement 10 includes a structure 26 which is formed as an open scaffolding. The structure 26 includes a proximal end 12, a distal end 32 and at least one face 18. The proximal end 12 is coupled to the at least one face 18. In the figures, the proximal end 12 is coupled at a 90 degree angle to four faces 18. The four faces 18 illustrated are rectangular or square. It is anticipated, however, that only one face 18 could be used. This face 18 would be curved in order to form a cylindrical aggregate replacement. It is also anticipated that three faces 18 could be utilized in order to form a structure with a triangular cross section. A plurality of faces 18 greater than four could also be used to form the structure 26. The number of faces 18 and the desired shape of the structure 26 will determine the angle at which the faces are coupled to the proximal end 12. The four faces 18, shown in the figures, are also coupled to each other at 90 degree angles. The angle at which the faces 18 are coupled to each other will vary depending on the number and shape of faces 18 utilized. The distal end 32 is coupled to the remaining open edges of the four faces 18. The arrangement described and depicted in the figures results in a cube or rectangular prism shaped structure 26. However, the structure 26 may be any type of shape desired. The at least one face 18, proximal end 12, and distal end 32 may also be formed in any shape desired.

In additional embodiments, the structure 26 may be curved in order to form circular, serpentine or other irregularly shaped drains.

The structure 26 forms a mostly hollow interior 20. The mostly hollow interior 20 may contain supports or other devices necessary to strengthen the structure 26. However, these devices should not impede the flow of water in the interior 20 of the structure 26. The mostly hollow interior 20 of the structure 26 allows water to drain through the structure 26 just like water would drain through the washed gravel or synthetic aggregate of traditional drains.

Figure 2:
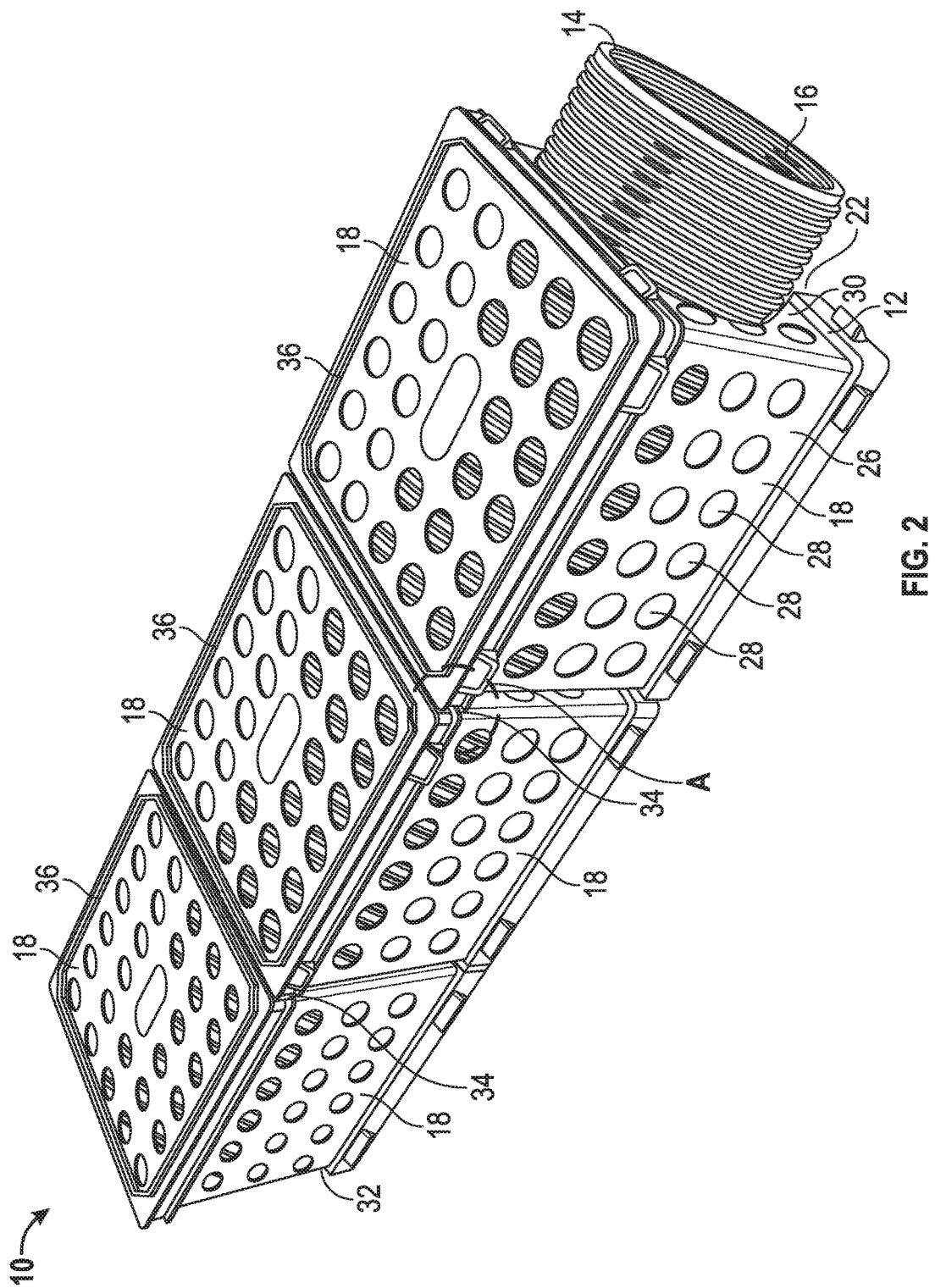
FIG. 2 is an isometric view of an aggregate replacement configured according to a second embodiment.
Figure 3:
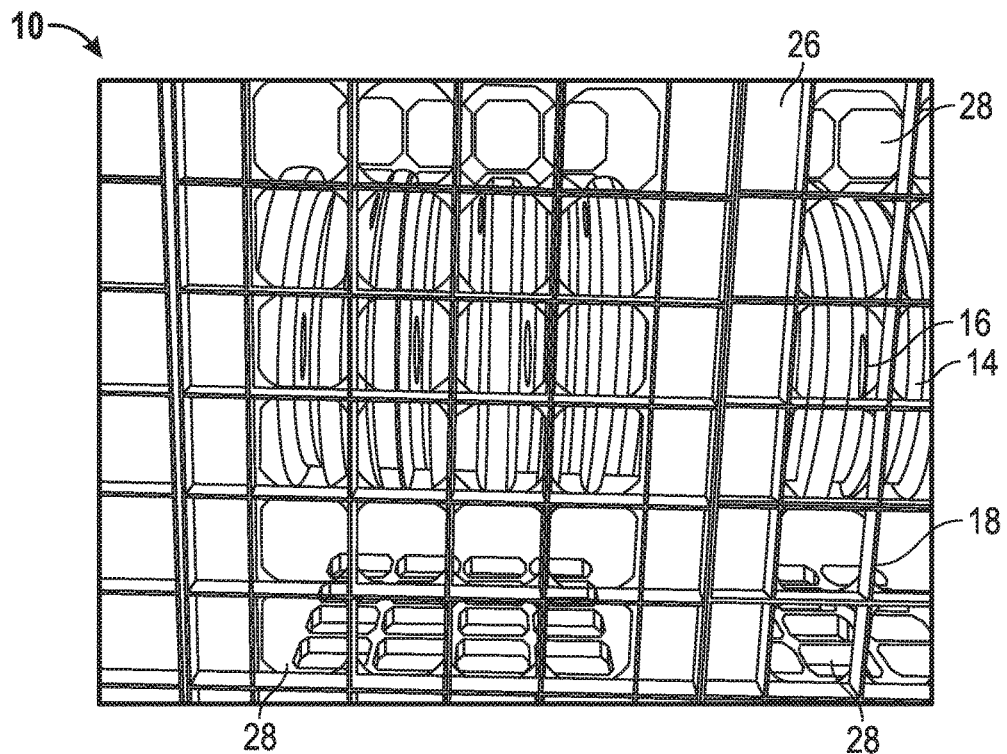
FIG. 3 is a first side view of an aggregate replacement configured according to the embodiments of FIG. 1.
Figure 4:
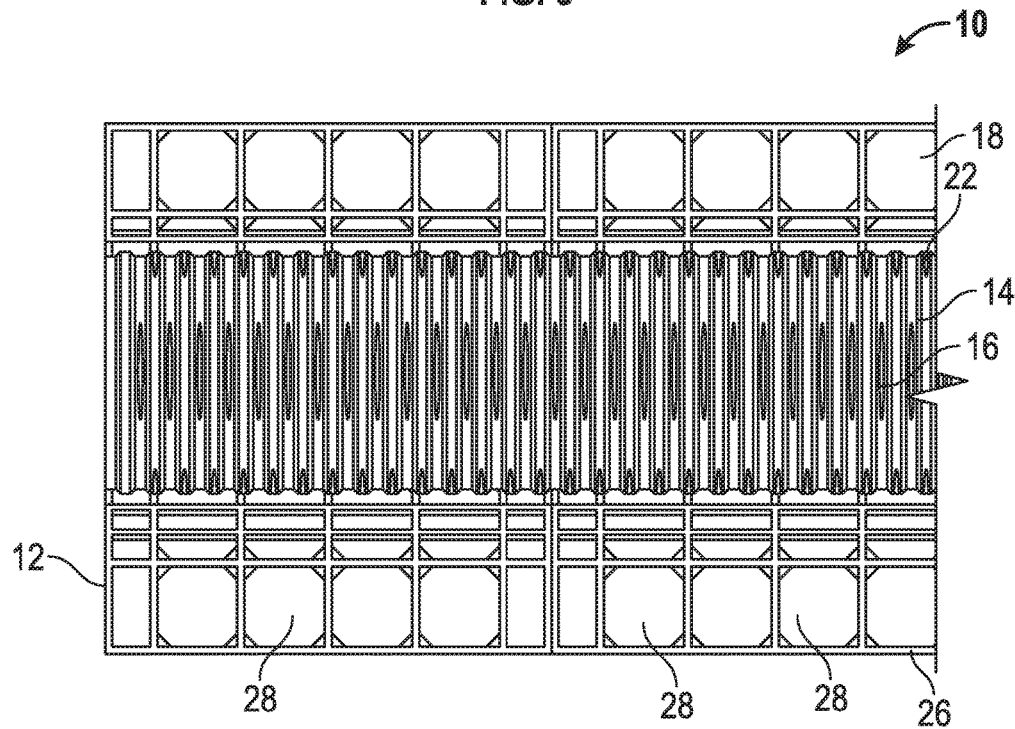
FIG. 4 is a second side view of an aggregate replacement configured according to the embodiments of FIG. 1.

The proximal end 12, distal end 32 and at least one face 18 are water permeable. This is accomplished by forming at least one first opening 28 in the proximal end 12, distal end 32 and at least one face 18. In FIG. 1, the proximal end 12, distal end 32 and four faces 18 are all formed with multiple square openings 28 separated by thin structural members which help structure 26 maintain its shape while allowing fluid, typically water, to pass easily through the proximal end 12, distal end 32 and faces 18. FIG. 2 has multiple round openings 28 in the proximal end 12, distal end 32 and at least one face 18. The at least one first opening 28 may be any size or shape desired so long as the openings 28 are a size and shape that allow water to easily permeate the surfaces of the structure 26 and enter the mostly hollow interior 20.

It alternate embodiments, the proximal end 12, the distal end 32 of the structure 26 and at least one but not all of the faces 18 may not contain any openings 28.

Figure 11:
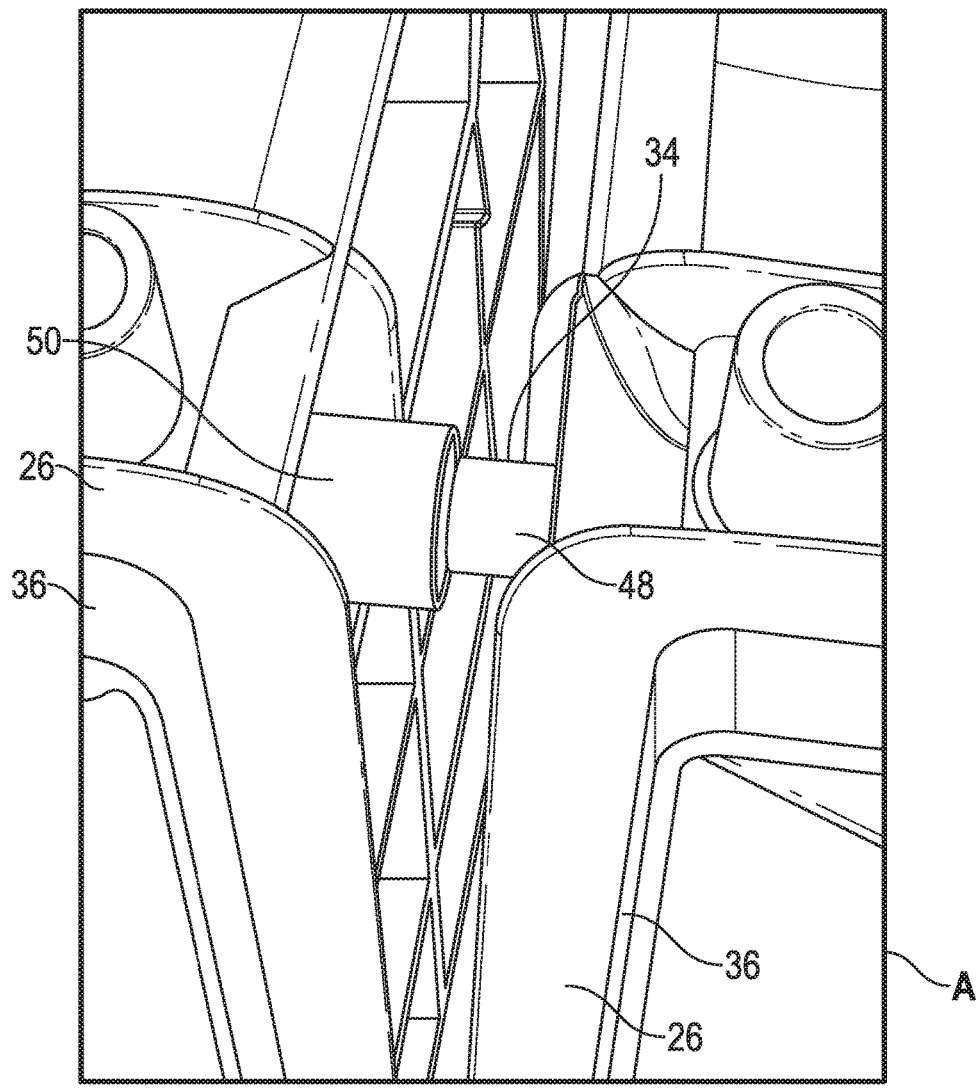
FIG. 11 is a close up view of an area denoted by A in FIG. 2.

The aggregate replacement 10 may be formed as one single piece that runs the entire length of the drain or it may be formed in smaller pieces that are connected together. FIG. 2 illustrates an embodiment of an aggregate replacement 10 which is composed of multiple units 36 which are coupled together with connectors 34. These connectors 34 may be any type of connector that holds two aggregate replacement units 36 together. FIG. 11 is a close up of section A from FIG. 2. FIG. 11 shows a connector 34. In this illustration, the connector is a pin 48 which slides into a receiver 50. The pin 48 is simply a cylindrical extension from the structure 26 of the aggregate replacement 10. The receiver 50 is an open cylindrical extension of the structure 26 of the aggregate replacement 10. The pin and the receiver are close enough in size that by inserting the pin 48 into the receiver 50, the units 36 are kept reasonably securely connected.

In alternate embodiments, the connector 34 may be flexible in order to allow the units 36 to be connected in a circular, serpentine, or non-linear arrangement.

In other embodiments, multiple units 36 may simply be placed adjacent each other without the use of connectors. The pipe 14 would then be inserted into the units 36. The units 36 would be held adjacent to each other by the pipe 14.

FIGS. 1-6 also show a second opening in a face 18 of the structure 26. The second opening may comprise an insertion opening 22, a pipe retainer and a pipe receiver 30. The insertion opening 22 is created in one of the at least one faces 18 of the structure 26. The insertion opening 22 allows a pipe 14 with perforations 16 to be inserted in a radial direction into the aggregate replacement 10. The insertion opening 22 should be large enough to allow a pipe 14 of a desired size to be inserted into the structure 26 of the aggregate replacement 10. The insertion opening 22 runs the entire length of one of the at least one faces 18 as shown FIG. 4 which is a side view of the aggregate replacement 10.

Figure 5:
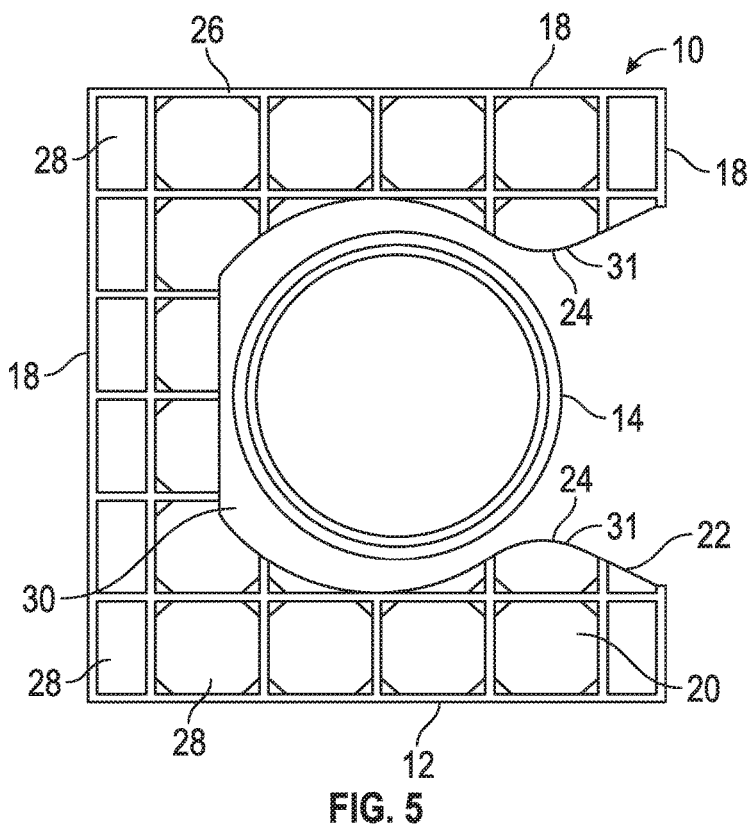
FIG. 5 is an end view of an aggregate replacement configured according to the embodiments of FIG. 1.

FIG. 5 is a view of the proximal 12 or distal end 32 of the structure 26. The insertion opening 22 also extends through the proximal end 12 and the distal end 32 of the structure 26. In the proximal end 12 and the distal end 32 of the structure, the insertion opening 22 forms a pipe receiver 30.

The pipe receiver 30 is an opening formed in the proximal end 12 and the distal end 32 of the structure 26. The pipe receiver 30 is slightly larger than the diameter of the pipe 14 and holds the pipe 14 when the drain is in place. The pipe receiver 30 has a mouth which connects to the insertion opening 22.

At the mouth 31 of the pipe receiver 30, may be a pipe retainer. The pipe retainer may comprise at least one protrusion 24. The at least one protrusion 24 narrows the insertion opening 22 to less than the diameter of the pipe 14. The at least one protrusion 24 may be flexible, or the pipe 14 may be slightly flexible in order to allow the pipe 14 to be forced past the at least one protrusion 24 and through the mouth 31 of the pipe receiver 30. The at least one protrusion 24 will then hold the pipe 14 within the pipe receiver 30.

Figure 8:
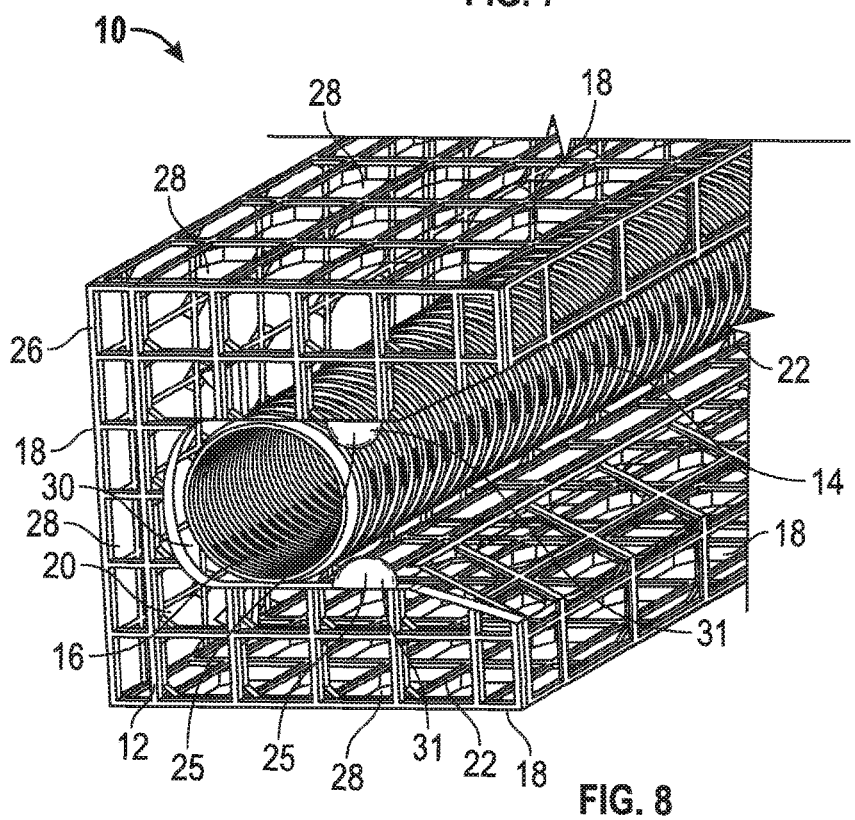
FIG. 8 is an isometric view of an aggregate replacement configured according to a fifth embodiment.

The pipe retainer may also be simply a narrowing of the insertion opening 22 or in an alternate embodiment of the invention as shown in FIG. 8, the pipe retainer may be tabs 25 manufactured at the mouth of a U shaped pipe receiver 30. The tabs 25 along with the U shaped pipe receiver 30 act to hold the pipe 14 in place within the aggregate replacement 10.

Figure 7:
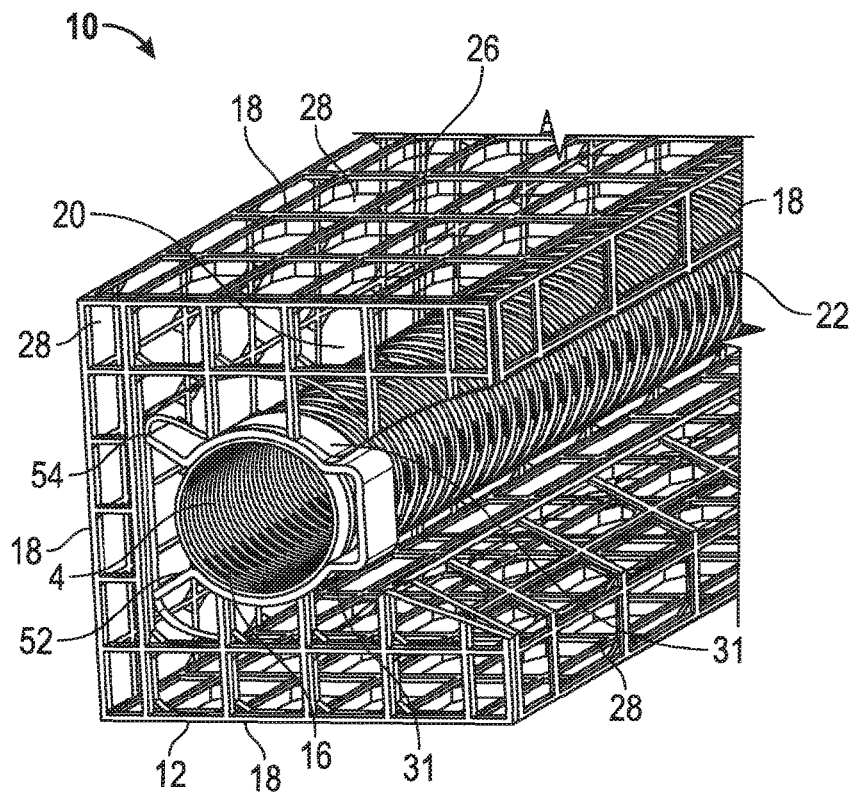
FIG. 7 is an isometric view of an aggregate replacement configured according to a fourth embodiment.

FIG. 7 illustrates an additional embodiment of the aggregate replacement 10, where the pipe retainer uses a pipe clip 52 placed on the pipe 14, prior to the pipe 14 being placed in the insertion opening 22. The pipe clip 52 is then snapped into a pipe clip retainer 54 which is formed into the edge of the pipe receiver 30. The pipe 14 is then held firmly in place in the pipe receiver 30.

Figure 9:
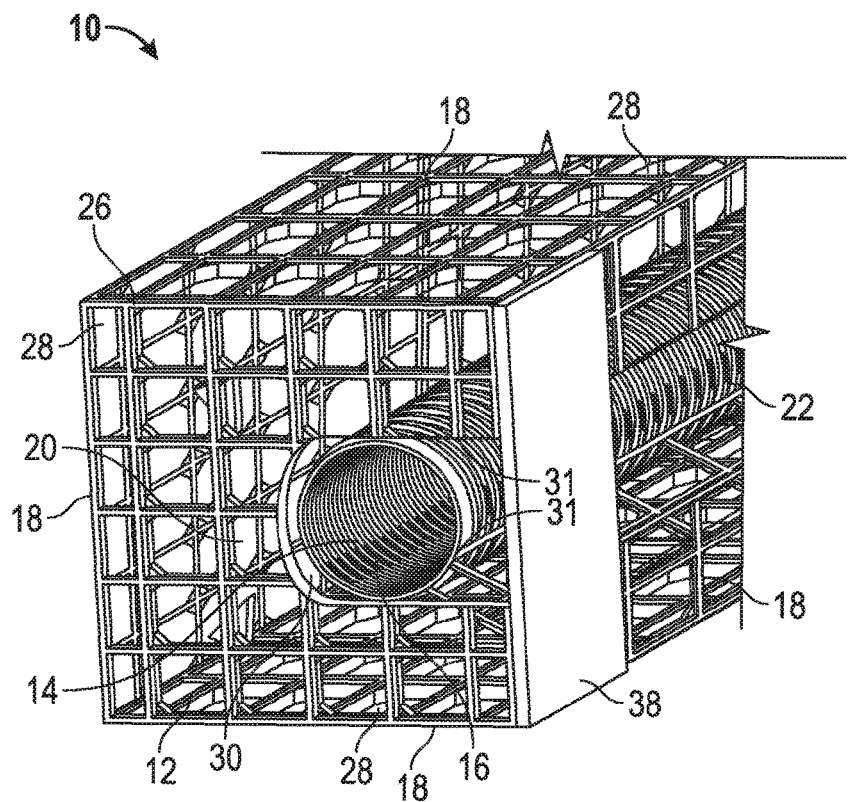
FIG. 9 is an isometric view of an aggregate replacement configured according to a sixth embodiment.

FIG. 9 illustrates yet another embodiment of the pipe retainer. In this embodiment, the pipe 14 is held in the pipe receiver 30 by a strap 38 which is coupled to the structure 26 of the aggregate replacement 10.

Figure 10:
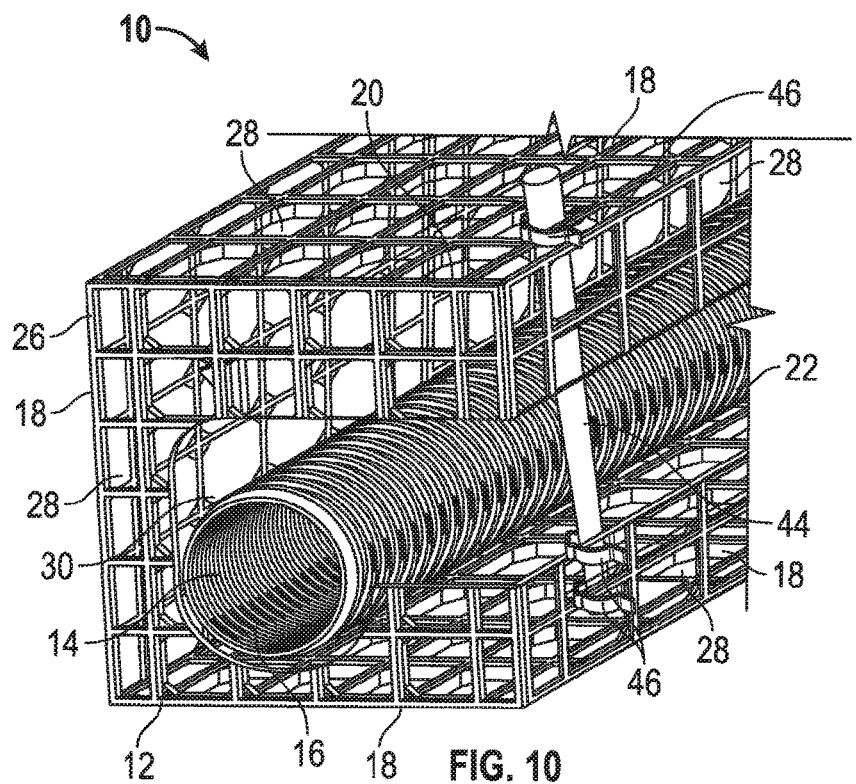
FIG. 10 is an isometric view of an aggregate replacement configured according to a seventh embodiment.

In FIG. 10, the pipe 14 is retained in place in the pipe receiver 30 by gravity. The insertion opening 22 is located slightly above the center of the pipe receiver 30. The pipe 14 passes through the insertion opening 22 and drops into the pipe receiver 30. The pipe 14 then stays in place because it is lower than the insertion opening 22.

FIG. 10 also shows a pipe retainer using a stake 44 which is placed in a stake retainer 46. The stake 44 is simply a metal or wooden stake or rigid rod that is placed inside of an opening called a stake retainer 46. The stake 44 is then usually driven into the ground under the aggregate replacement 10. The stake 44 serves two purposes. First, the stake 44 holds the aggregate replacement 10 in place. Second, the stake 44 prevents the pipe 14 from leaving the pipe receiver 30.

The stake retainer 46 may be a hole in the structure which is designed to have the stake 44 placed in it, as shown in FIG. 10. The stake retainer 46 may also be a strap which straps the stake 44 to the outside of the structure 26. The stake retainer 46 may further be a bolt or screw which bolts or screws the stake 44 to the structure 26. The stake retainer 46 may be any device which couples the stake 44 to the structure 26. Coupling the stake 44 to the structure 26 may include receiving the stake 44 in an opening, physically attaching the stake 44 to the structure 26 or the like.

Figure 6:
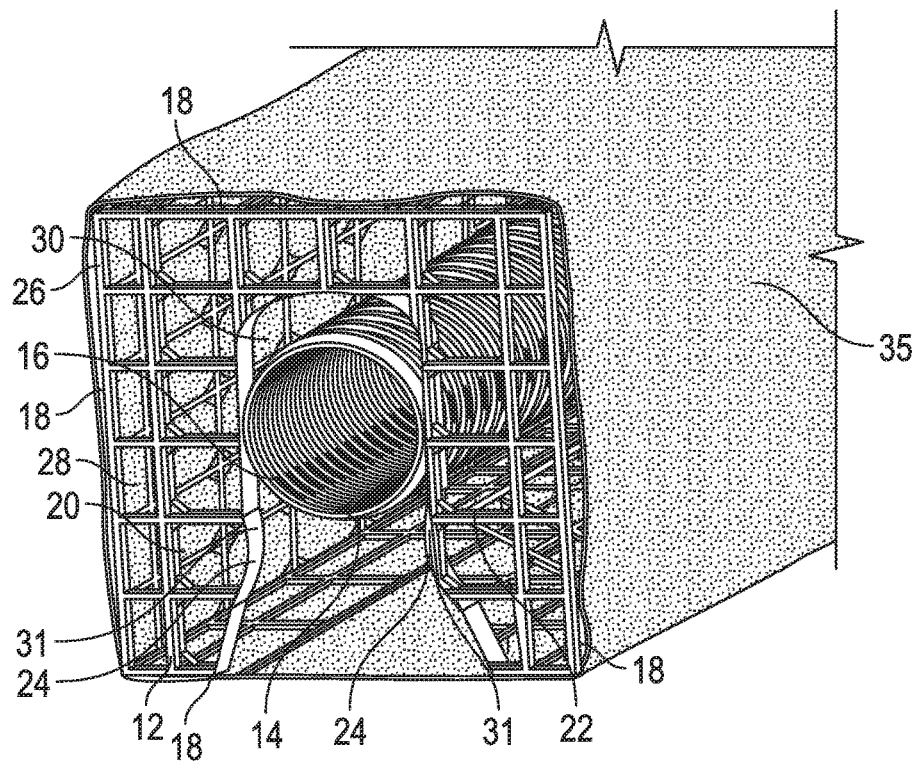
FIG. 6 is an isometric view of an aggregate replacement covered by a liner configured according to a third embodiment.

Once the pipe 14 is inserted into the aggregate replacement 10, the aggregate replacement 10 is either placed in a trench lined with filter fabric or the aggregate replacement 10 is wrapped in filter fabric. FIG. 6 illustrates the aggregate replacement 10 wrapped in filter or landscape fabric 35. The filter or landscape fabric 35 is the same type of fabric used in traditional arrangements of a French drain. The fabric 35 is a water permeable material that prevents soil, rocks, substrates or other things that might clog the perforations 16 in the pipe 14 from entering the aggregate replacement 10.

In using the aggregate replacement 10 embodiments described above, a trench is dug where the drain or distribution system is to be placed. The trench is lined with a water permeable fabric 35 such as landscape fabric, filter fabric, water permeable material or the like. The aggregate replacement 10 is then assembled. If there is more than one unit 36, then the units 36 may be connected together through use of the connectors 34. The pipe 14 is then inserted through the insertion opening 22. The pipe 14 is forced past the protrusions 24 or tabs 25 if protrusions 24 or tabs 25 are being used. The pipe 14 passes through the mouth of the pipe receiver 31 and into the pipe receiver 30. If protrusions 24 or tabs 25 are not being used, then the pipe retainer is now engaged. The aggregate replacement 10 along with the pipe 14 already inserted is then laid on top of the fabric 35 in the trench. Typically, the aggregate replacement 10 will be placed in the trench with the insertion opening 22 positioned towards the bottom of the trench as shown in FIG. 6. This position places the pipe 14 towards the bottom of the trench where more water can flow through the perforations 16 into the pipe 14. The fabric 35 is then wrapped around the aggregate replacement 10 and the trench is filled in.

In alternate embodiments the aggregate replacement 10 may be wrapped in the fabric 35 prior to being placed in the trench.

The pipe 14 could also be inserted into the aggregate replacement 10 after the aggregate replacement 10 is in place in the trench.

When in use, water flows through the fabric 35 and through the openings 28 in the faces 18 of the aggregate replacement 10 structure 26. The water then flows through the perforations 16 into the pipe 14. The pipe 14 will typically be angled so that the water flows down the pipe 14 and to a desired location.

This process works in reverse for other water distribution systems such as those used in residential septic systems.

Figure 12:
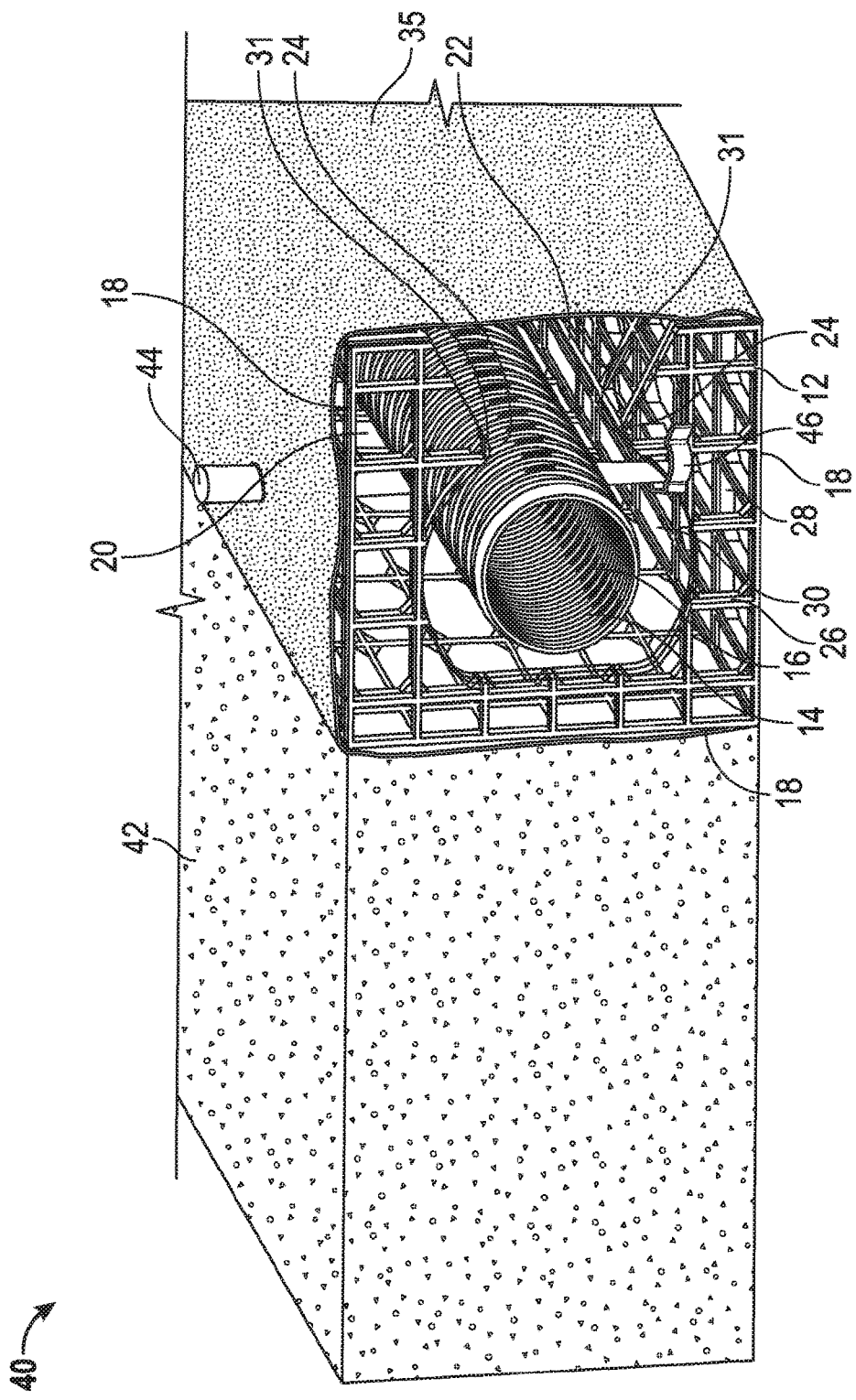
FIG. 12 is an isometric view of an aggregate replacement concrete form configured according to an embodiment.

An additional embodiment of the aggregate replacement is illustrated in FIG. 12. In this embodiment, the aggregate replacement 40 is formed as described above. A stake retainer 46 may also be formed in the structure 26 on the side of the pipe receiver 30 away from the insertion opening 22. The stake 44 in this case will be used only to hold the aggregate replacement 40 in place. In alternate embodiments, a stake retainer 46 may be anything that couples the stake 44 to the structure 26. The aggregate replacement 40 is put in position with the face 18 of the structure 26 opposite the insertion opening 22 acting as a concrete form. The face 18 of the structure 26 opposite the insertion opening 22 is covered with a concrete barrier 35 such as filter fabric, landscape fabric, screen, water permeable material, solid plastic or the like. The concrete barrier 35 may or may not be water permeable. The concrete barrier 35 may be any material that retains the concrete in place while it is curing.

Concrete 42 may then be poured, with the concrete 42 coming up against the water permeable barrier 35. Once the concrete 42 has dried, the pipe 14 may be placed in the aggregate replacement 40 if it has not already been placed.

This arrangement allows moisture to be drained away from the concrete 42. The moisture travels through the material 35, passes through the aggregate replacement 40 and enters the pipe 14 through the perforations 16. The moisture then travels down the pipe 14 and away from the concrete 42.

Figure 13:
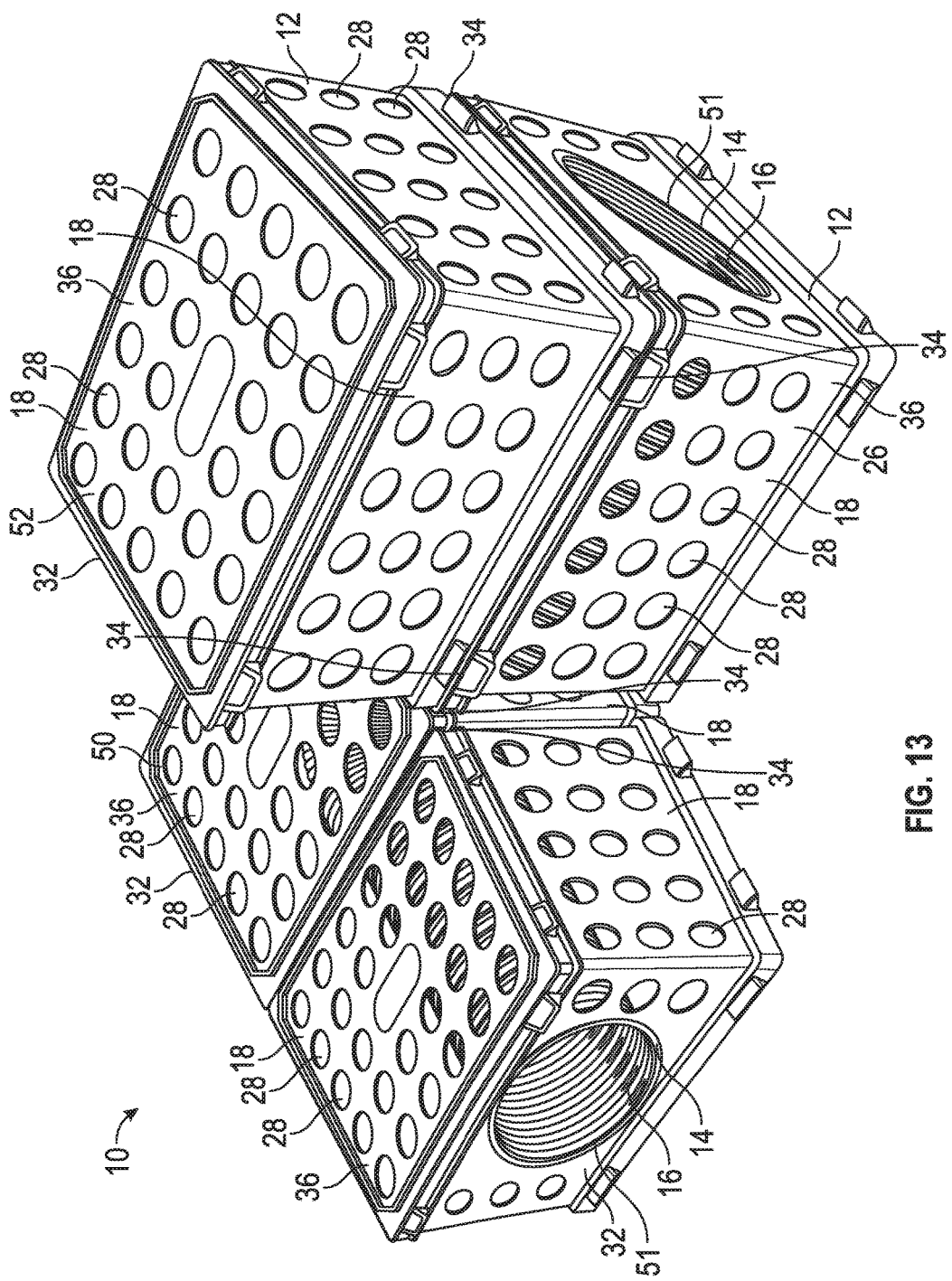
FIG. 13 is an isometric view of an aggregate replacement configured according to a seventh embodiment.

FIG. 13 illustrates another embodiment of an aggregate replacement 10. In this figure, the aggregate replacement 10 is formed from multiple units 36. Each unit 36 is formed from four faces 18. Each face 18 is illustrated as a flat rectangular member as described previously. Each face 18, however, may also be curved or angled. The face 18 may also be formed as a rectangle, square, oval, circle or the like. Each face 18 may be formed in any shape or size desired.

Each face 18 also has at least one opening 28 formed in it. Typically, multiple openings 28 will be formed in the face 18. Each opening 28 passes completely through the face 18 in order to allow fluid, such as water, to travel through the face 18 to the interior of the aggregate replacement 10. In alternate embodiments, the fluid may travel through the face 18 to the exterior of the aggregate replacement 10.

The openings 28 are illustrated as circles, however, they may be circles, squares, triangles, rectangles, hexagons, pentagons, polygons and the like. The openings 28 may be formed in any shape desired that allows fluid to easily pass through the face 18 while leaving the face 18 strong enough to withstand the weight and stresses of use.

In FIG. 13, the aggregate replacement 10 units 36 are formed using four faces 18 coupled together at right angles. In alternate embodiments, however, multiple faces 18 may be used. The angle that each face 18 is coupled to the next face 18 depends on the number of faces 18 being used.

Each face 18 is additionally coupled to a proximal end 12 and a distal end 32 in order to form a structure 26. The faces 18 and the proximal end 12 and distal end 32 may be identical or similar and may be interchangeable in certain embodiments.

The proximal end 12 and the distal end 32 are illustrated as square or rectangular members. The shape of the proximal end 12 and the distal end 32, however, will depend on the number of faces 18 used in order to form the structure 26. The proximal end 12 and the distal end 32 may be any size or shape desired. The proximal end 12 and the distal end 32 should, however, provide a cover or substantially close the open ends of the structure 26 formed by the faces 18.

The proximal end 12 and the distal end 32 of each unit 36 may be similar to the at least one face 18 discussed above. The proximal end 12 and distal end 32 may each have at least one opening 28 in its surface in order to allow fluid to easily pass to through the surface of the aggregate replacement 10. The fluid may pass to the inside of the aggregate replacement 10 or to the outside, depending on the desired use of the aggregate replacement 10.

Certain configurations of aggregate replacement 10 units 36 may simply replace large portions of aggregate. These units 36 may be referred to as pipe-less units 52. Pipe-less units 52, as illustrated, have multiple openings 28 on all surfaces. They do not, however, have an opening that would retain or replace a pipe such as a pipe used in a typical drainage field.

Pipe-less units 52 may be any size or shape desired.

Pipe-less units 52 may be coupled to units 36 containing pipe, in order to replace larger areas of aggregate. Multiple pipe-less units 52 may be coupled to units 36 with pipe in order to create large drain fields.

If desired, pipe-less units 52 may also be used in areas where it is desired to drain fluid, but not divert it. Diverting fluid from a given area typically requires some sort of pipe or conduit to direct the fluid. However, if the user simply wants to help a field or yard drain better, pipe-less units 52 may be placed under the surface of the soil in order to give the fluid an area to drain to.

Multiple pipe-less units 52 may also be coupled together.

In alternate embodiments, pipe-less units 52 may be formed from multiple panels, faces or ends which may be coupled together to form the desired shape and size. The multiple panels, faces or ends could also be cut to the desired size in order to allow a user to create custom size pipe-less units 52 for their various applications. Similar configurations could be used for units 36 containing pipe.

As illustrated in FIG. 13, other units 36 may contain a pipe 14. These units 36 are similar to those discussed above with respect to previous figures, except that in the units 36 illustrated in this figure, the pipes 14 are formed as an integral part of the aggregate replacement 10 units 36. The pipes 14 may also be coupled to the aggregate replacement 10 units 36 or may simply be placed in the aggregate replacement 10 units 36, rather than formed as an integral part of the aggregate replacement 10 units 36.

The pipes 14 used in the aggregate replacement 10 will typically be a plastic pipe with perforations 16 formed in it. These perforations 16 allow fluid from the outside of the pipe 14 to seep into the pipe 14. The perforations 16 may be circular holes, linear cuts or the like formed in the pipe 14. The pipe 14 then diverts the fluid such as water to a more desirable location.

In alternate uses, such as septic drainage fields, the perforations 16 in the pipe 14 may allow the fluid inside the pipe 14 to seep out.

The pipe 14 may or may not be corrugated. The pipe 14 may be any size, shape or length desired. The pipe 14 may have a circular, square, rectangular or triangular cross-section or the like. The pipe 14 may be rigid or flexible plastic. The pipe 14 may also be formed from any material desired, such as plastic, fiberglass, iron, copper, steel, aluminum or the like.

The pipes 14 are in communication or coupled to a pipe opening 51 formed in the proximal end 12 and the distal end 32 of each unit 36. The pipe opening 51 is an opening in the proximal end 12 and the distal end 32 of the units 36 that is approximately the same size as the pipe 14 and which secures the pipe 14 in place, Additional embodiments of aggregate replacement 10 units 36 may include units that act as 90 degree turns, T's, 45 degree turns, and discharges. A 90 degree turn unit 50 is illustrated in the figure. The 90 degree turn unit 50 has a pipe opening 51 in the proximal end 12 of the unit. It also has a pipe opening 51 in one of the faces 18 of the unit 50. This causes the pipe 14 in the 90 degree turn unit 50 to turn 90 degrees within the aggregate replacement 10. This type of unit 50 may be useful in draining water from around concrete foundations and the like.

A T unit 36 in the aggregate replacement 10 would include a pipe opening 51 in the proximal end 12 of the unit 36. Additional pipe openings 51 would be located in two parallel faces 18 located opposite each other in the unit 36. The pipe 14 would start at the proximal end 12 of the aggregate replacement unit 36. The pipe 14 would then split into two pipes 14 with one pipe 14 coupled to each of the pipe openings 51 formed in the faces 18 of the unit 36. In use, fluid would either flow into the unit 36 as one stream and leave the unit 36 as two, or else two streams of fluid would be combined into one stream as it leaves the unit 36.

Other pipe 14 configurations or fittings could be formed in the aggregate replacement 10 units 36 similarly to those described above.

Multiple aggregate replacement 10 units 36 may be coupled together using connectors 34. Connectors 34 may be any type of coupling device or method that allows multiple units 36 to be hooked together. This may include units 36 being coupled with male and female connectors or units being coupled with connectors 34 such as those described in conjunction with FIG. 11. Connectors 34 may be permanent or removable. Removable connectors 34 may be desirable in order to allow damaged aggregate replacement 10 units 36 to be removed and replaced.

Units 36 may be coupled together end to end, such as where the proximal end 12 of one unit 36 is coupled to the distal end 32 of another unit 36, or the units 36 may be coupled or connected side to side or stacked.

In embodiments where a pipe 14 is formed as an integral part of the aggregate replacement 10, it may be desirable to couple the separate pipe 14 sections together as well as the units 36.

Figure 14:
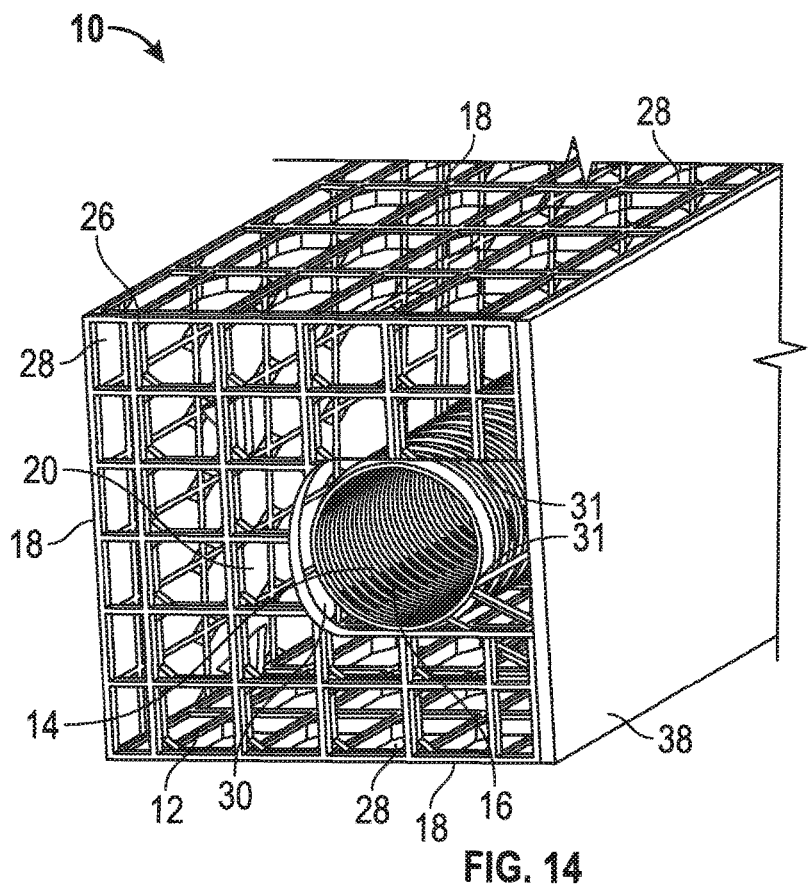
FIG. 14 is an isometric view of an aggregate replacement configured according to an eighth embodiment.

FIG. 14 illustrates an alternate embodiment of FIG. 9. In FIG. 14 the strap 38 covers the entire mouth of the pipe retainer 31. The strap 38 may also cover the entire face 18 of the aggregate replacement 10 in which the mouth of the pipe retainer 31 is located. The strap 38 may be any size, shape, thickness or formed from any material desired. The strap 38 may be corrugated or flat. The strap 38 may also be bent, curved, angled or the like. The strap 38 may be formed from rigid or flexible material.

Figure 15:
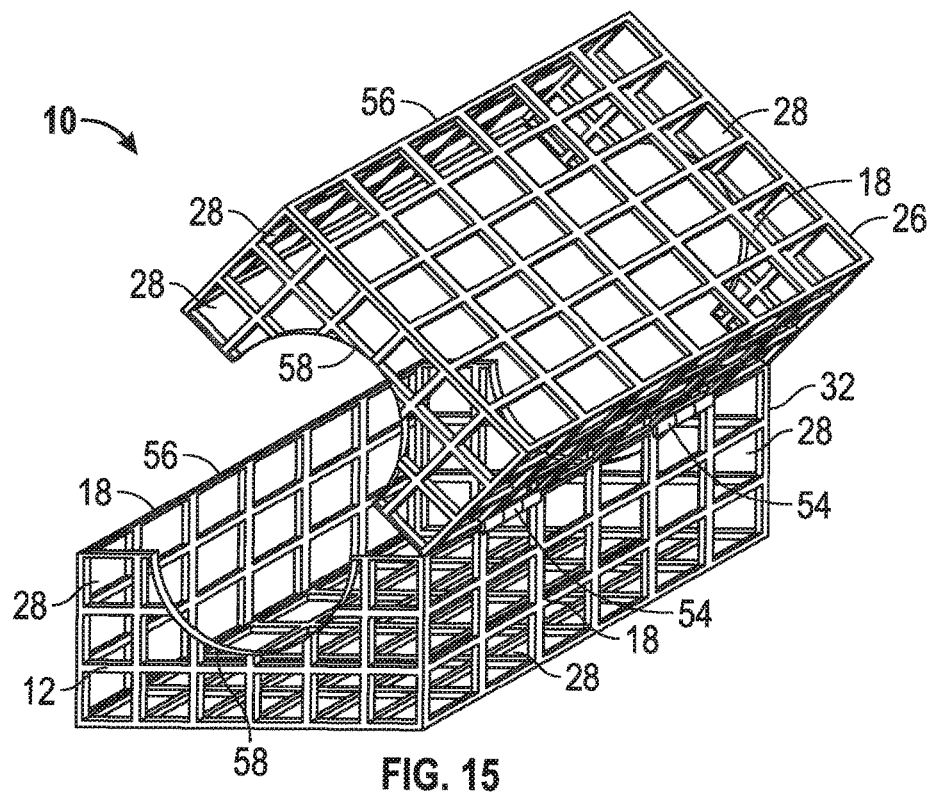
FIG. 15 is an isometric view of an aggregate replacement configured according to a ninth embodiment.

FIG. 15 illustrates an additional embodiment of an aggregate replacement 10. In this embodiment, the aggregate replacement 10 is formed in two sections 56. Each section 56 has three faces 18 and a proximal end 12 and a distal 32 end. The proximal end 12 and distal end 32 of the aggregate replacement 10 include or comprise a cutout 58. The cutout 58, as shown in the figures, is a half circle opening along the edge of the proximal end 12 and distal end 32 configured to receive a pipe. The cutout 58 may also be any shape desired. The cutout 58 may be horseshoe shaped, square, rectangular, triangular or the like, provided the cutout 58 can accommodate or receive a pipe.

The two sections 56 of the aggregate replacement 10 are coupled together on one side by at least one hinge 54 or other rotatable coupler. Hinge 54 may be anything that rotatable couples the two sections 56 together on one side. Examples of hinges 54 may include hinges, flexible members, tethers, and the like. The other side of the two sections 56 are not connected. Two hinges 54 are illustrated in the figure, however, depending on the size of the aggregate replacement 10, more or fewer hinges 54 may be required.

In order to use the embodiment illustrated in FIG. 15, the two sections 56 are rotated into an open position. A pipe is then placed in the cutout 58 of the lower section 56 of the aggregate replacement 10. Once the pipe is in place, the top section 56 of the aggregate replacement 10 is rotatably lowered into a closed position.

In alternate variations on this embodiment, a latch may be used to keep the two sections 56 of aggregate replacement 10 in a closed position.

Additional embodiments may have multiple sections 56 rather than just two. Latches and hinges 58 could be used to secure the multiple sections 56 together.

Figure 16:
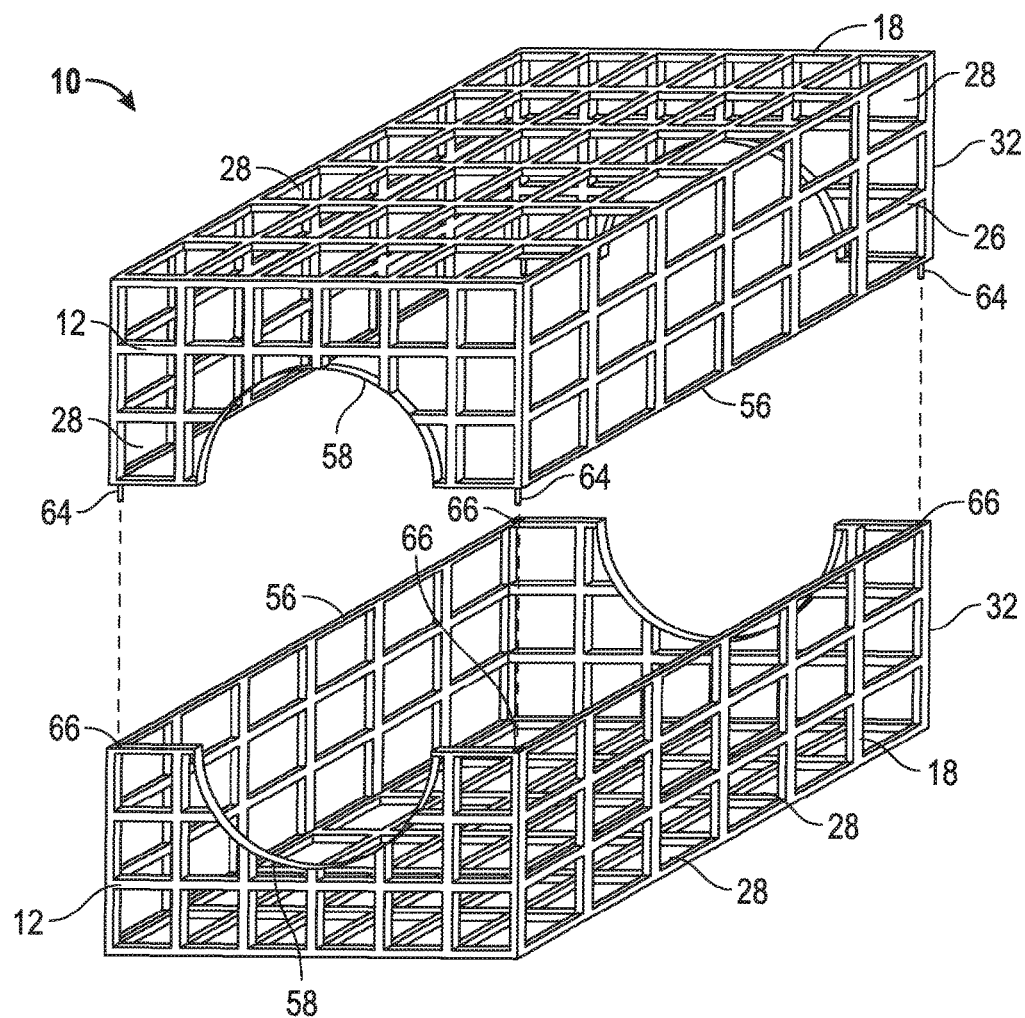
FIG. 16 is an isometric view of an aggregate replacement configured according to a tenth embodiment.

FIG. 16 illustrates an embodiment of an aggregate replacement 10 where the two sections 56 are completely separate. Once the pipe 14 is placed in position in the cutout 58 in the lower section 56 of the aggregate replacement 10, the upper section 56 of the aggregate replacement 10 is put in place.

The upper section 56 of the aggregate replacement 10 may have pins 64 which are inserted into receivers 66 on the lower section 56 of the aggregate replacement 10 in order to secure or couple the two sections 56 together. The pins 64 slide into receivers 66. The pins 64 are simply cylindrical extensions from the structure 26 of the aggregate replacement 10. The receivers 66 are open cylindrical indentations into the structure 26 of the aggregate replacement 10. The pins 64 and the receivers 66 are close enough in size that by inserting the pin 64 into the receiver 66, the sections 56 are kept reasonably securely connected.

Other coupling or connecting configurations may also be used to secure the two sections 56 together. Other connectors may include glue, epoxy, screws, bolts, tabs, latches or the like.

Figure 17:
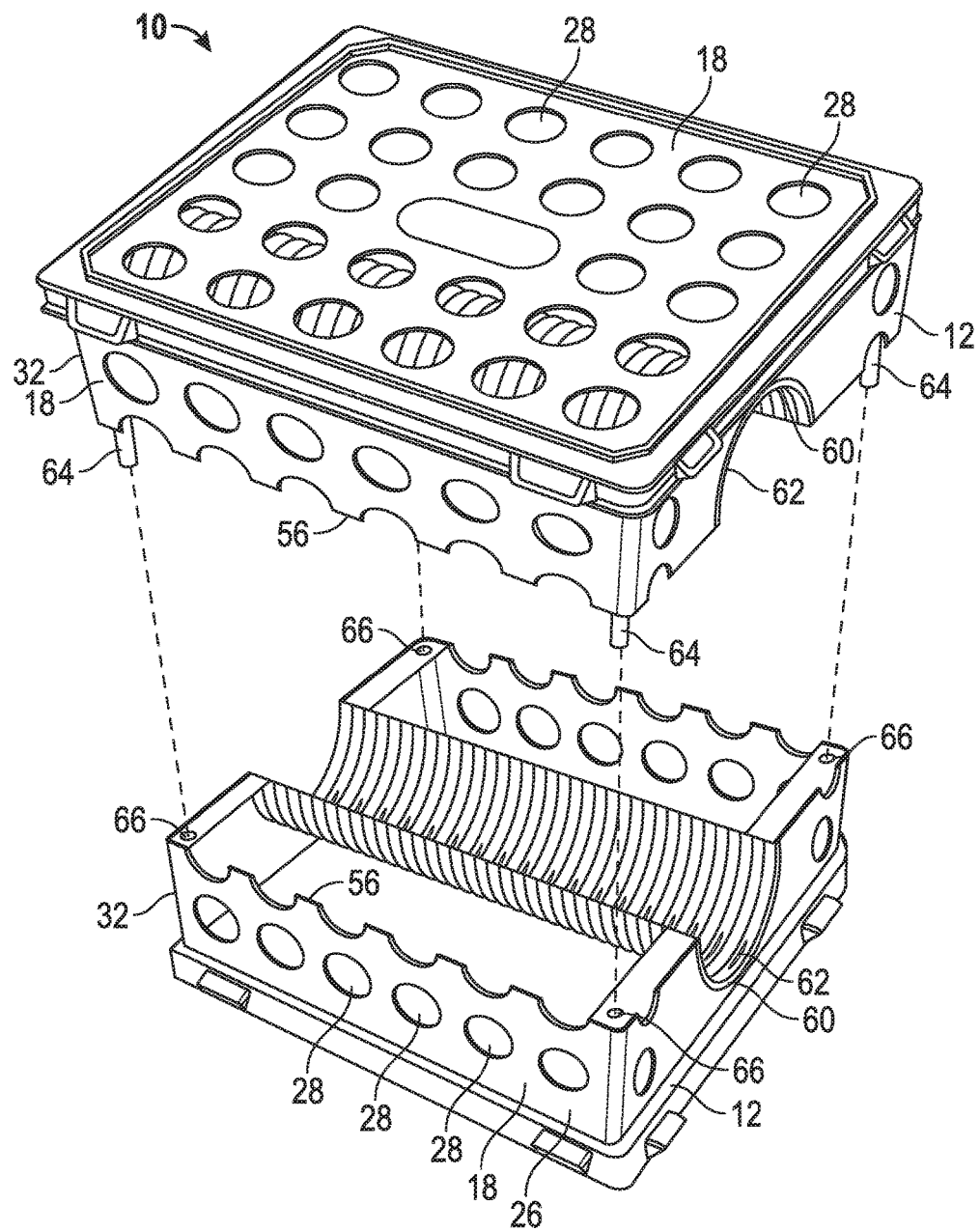
FIG. 17 is an isometric view of an aggregate replacement configured according to an eleventh embodiment.

FIG. 17 illustrates an embodiment of an aggregate replacement 10 which has two sections 56 with half pipes 60 formed integrally in each of the sections 56. The half pipe 60 may alternatively be coupled to each of the sections 56. Each half pipe 60 also has perforations 62 in order to allow fluid to move in and out of the pipe 60. The two sections 56 of the aggregate replacement 10 are snapped together using pins 64 and receivers 66 as described in the previous figure. The pins 64 slide into receivers 66. The pins 64 are cylindrical extensions from the structure 26 of the aggregate replacement 10. The receivers 66 are cylindrical openings in the structure 26 of the aggregate replacement 10. The pins 64 and the receivers 66 are close enough in size that by inserting the pin 64 into the receiver 66, the two sections 56 of the aggregate replacement 10 are kept reasonably securely connected.

The two sections 56 may also be coupled together using bolts, screws, glue, epoxy, latches and the like.

When the two sections 56 are coupled together, the two half pipes 60 meet and form a channel or pipe through which water or other fluid may flow.

In alternate configurations of this embodiment, the two half pipes 60 may have connectors, couplers or latches which secure the two half pipes 60 together.

Figure 18:
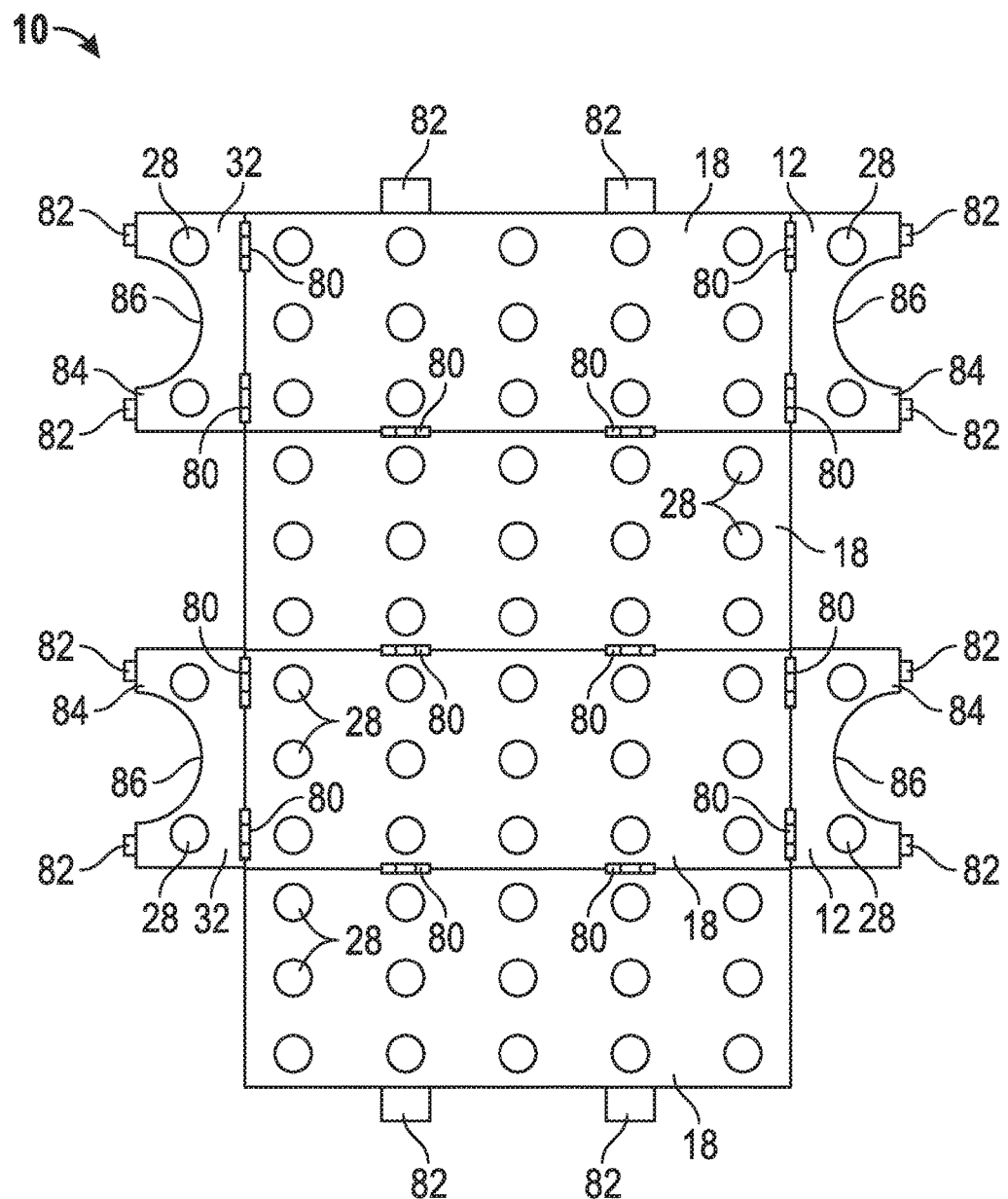
FIG. 18 is a top view of an aggregate replacement configured according to a twelfth embodiment.

FIG. 18 illustrates a collapsible embodiment of an aggregate replacement 10. In this configuration, each face 18 of the aggregate replacement 10 is hingedly coupled to at least one other face 18 of the aggregate replacement 10.

The two faces 18 on the ends have connectors 82 coupled to their outside edges. These connectors 82 act to hook the two outside faces 18 together in order to form a rectangular prism from all of the faces 18.

In alternate embodiments, one face 18 may be bent and coupled together in order to form a cylindrical aggregate replacement 10. Three faces 18 may be coupled together to form a triangular prism. Different numbers of faces 18 may be used in order to form different shapes of aggregate replacement 10.

Two of the faces 18 are also hingedly coupled to a partial proximal end or distal end 84. The partial ends 84 may be formed as a square with a half circle cutout 86 formed in the edge. The partial ends 84 may also be formed in any other shape desired. The shape of the partial ends 84 will likely depend on the shape created by the faces 18 when they are coupled together.

The partial ends 84 may have at least one connector 82 coupled to at least one of their edges. The at least one connector 82 may serve to secure the partial ends 84 in place when the aggregate replacement 10 is fully assembled.

In order to assemble the collapsible aggregate replacement 10 illustrated, the faces 18 may be coupled together in a rectangular prism using the connectors 82 attached to the two end faces 18. A pipe may then be inserted into the aggregate replacement 10. The partial ends 84 are then rotated and secured into place using the connectors 82 coupled to them.

The partial ends 84 secure the pipe in place in the aggregate replacement 10.

The collapsible aggregate replacement 10 may also be assembled by placing the pipe across at least one face 18 of the aggregate replacement 10. The aggregate replacement 10 is then assembled around the pipe.

Figure 19:
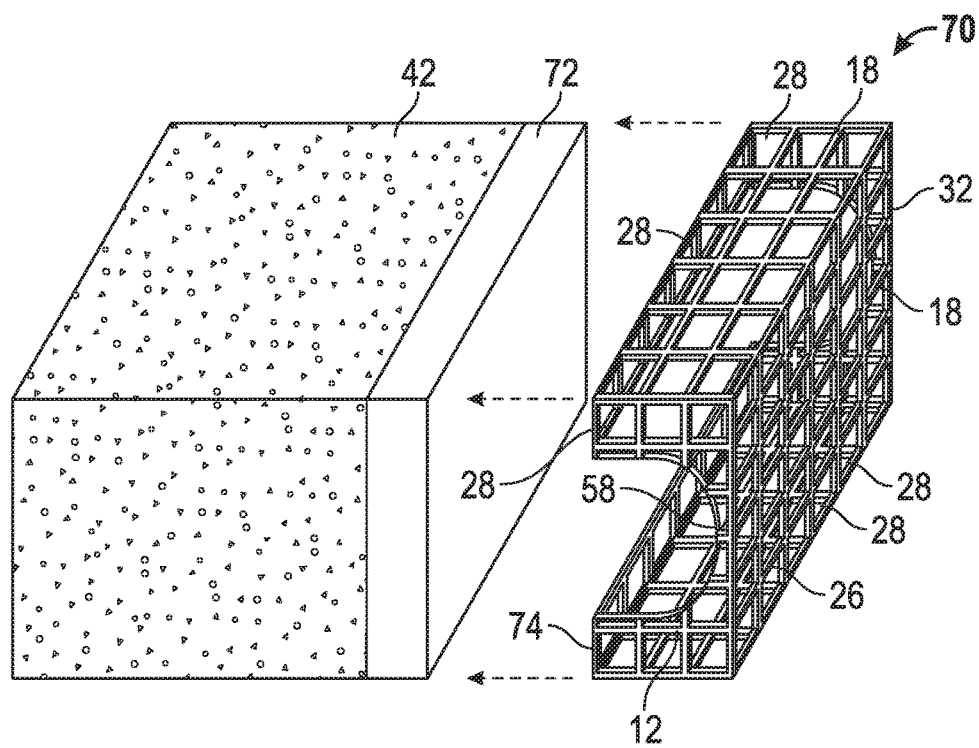
FIG. 19 is an isometric view of an aggregate replacement concrete form configured according to a second embodiment.

FIG. 19 illustrates a configuration of an aggregate replacement 70 for use with a concrete form. In this configuration, a permanent concrete form 72 such as a form that acts as a drain is put in place. The aggregate replacement 70 is then placed adjacent the concrete form 72. The aggregate replacement 70 acts to replace the aggregate, such as loose gravel, which is placed around permanent concrete forms 72 in order to help the concrete form 72 to drain any water near the concrete 42.

The aggregate replacement 70 in this configuration also has a cutout 58 which intersects the edge of the proximal end 12 and the distal end 32 and which would allow a pipe to be placed next to the permanent concrete form 72 in order to aid with the drainage of water. The cutout 58 or open area may run the entire length of the aggregate replacement 70 along the area where the pipe would be placed, so that the pipe abuts the concrete form 72 directly.

In alternate embodiments, water permeable material may be placed between the aggregate replacement 70 and the concrete form 72. In these configurations, the pipe would abut the water permeable material which would abut the concrete form 72.

In other embodiments, a small section of aggregate replacement 70 may separate the pipe from the concrete form 72 or water permeable material.

Additional embodiments, may not include cutouts 58 for pipe.

Figure 20:
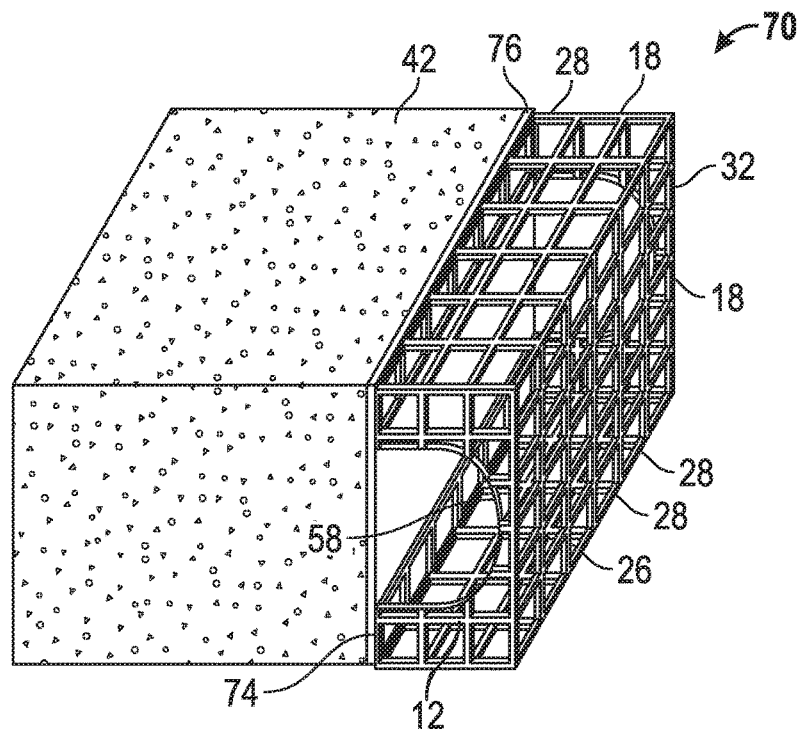
FIG. 20 is an isometric view of an aggregate replacement concrete form configured according to a third embodiment.

FIG. 20 is an additional embodiment of an aggregate replacement 70 for use as a concrete form. In this embodiment, the aggregate replacement 70 is the concrete form. The aggregate replacement 70 is placed into position along the location where the concrete 42 is to be poured. A water permeable material 74 is placed over the surface of the aggregate replacement 70 and then the concrete 42 is poured. The water permeable material 74 prevents the concrete from entering the aggregate replacement 70 while allowing any moisture near the concrete to travel out into the aggregate replacement 70.

The aggregate replacement 70 illustrated in this figure is also configured with a cutout 58 for receiving a pipe. The pipe may be placed before or after the concrete 42 is poured. Typically, however, the pipe will be placed prior to the concrete 42 being poured because it would be too difficult to place the pipe after.

The cutout 58 is formed in the edge of the proximal end 12 and the distal end 32 of the aggregate replacement 70. The cutout 58 also runs along the entire length of the aggregate replacement 70 so that the pipe abuts the water permeable material directly. The pipe acts to collect moisture around the concrete. The pipe then channels the moisture away from the concrete.

In alternate embodiments, a small section of aggregate replacement 70 may separate the pipe from the water permeable material.

Additional embodiments may not include cutouts 58 for a pipe.

In configurations where the aggregate replacement 70 is used as a concrete form or with a concrete form, it may be necessary to secure the aggregate replacement 70 in position by driving a wooden or metal stake through the aggregate replacement 70 and into the ground.

Figure 21:
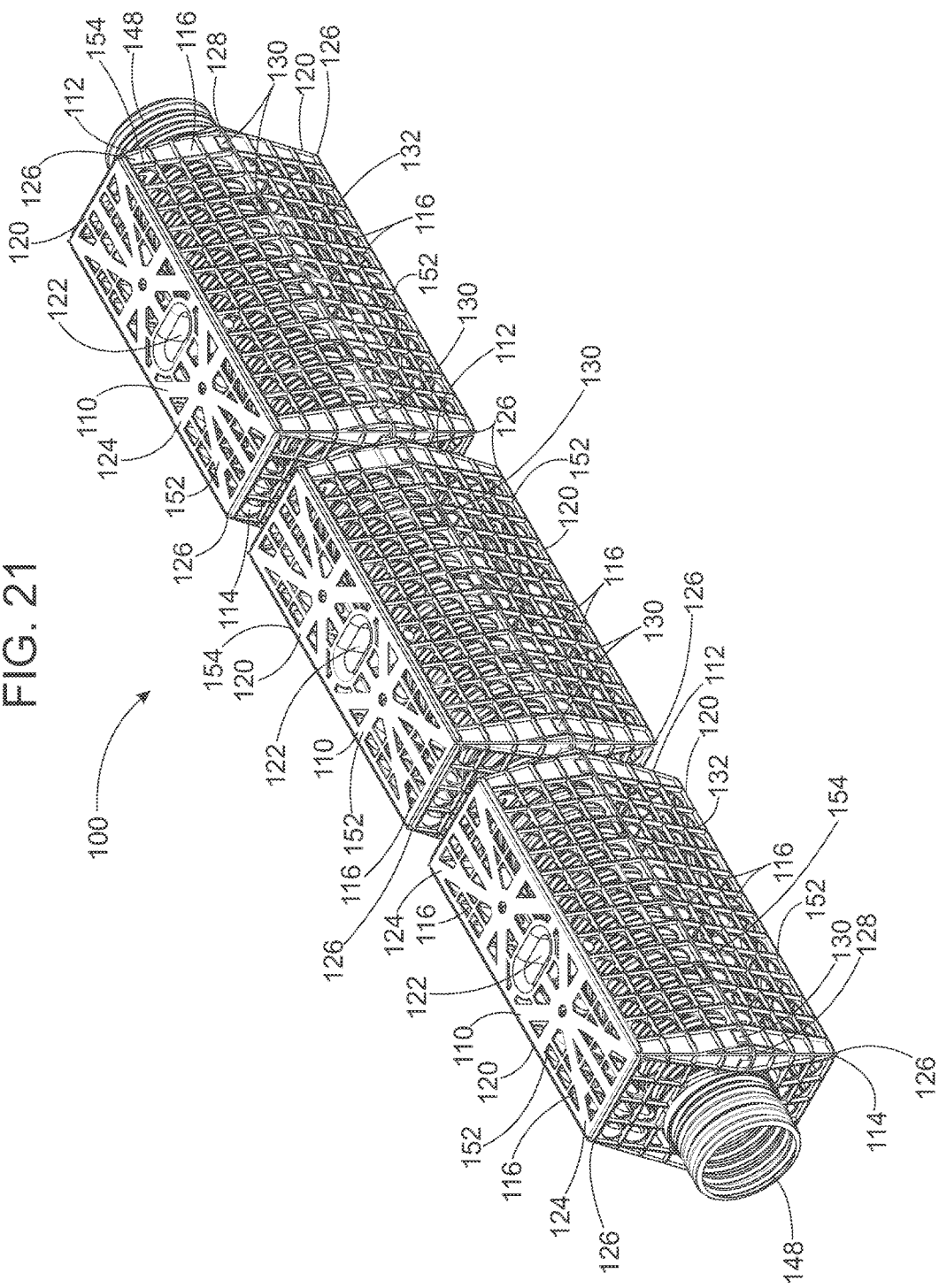
FIG. 21 is an isometric view of an aggregate replacement configured according to a thirteenth embodiment.
Figure 22:
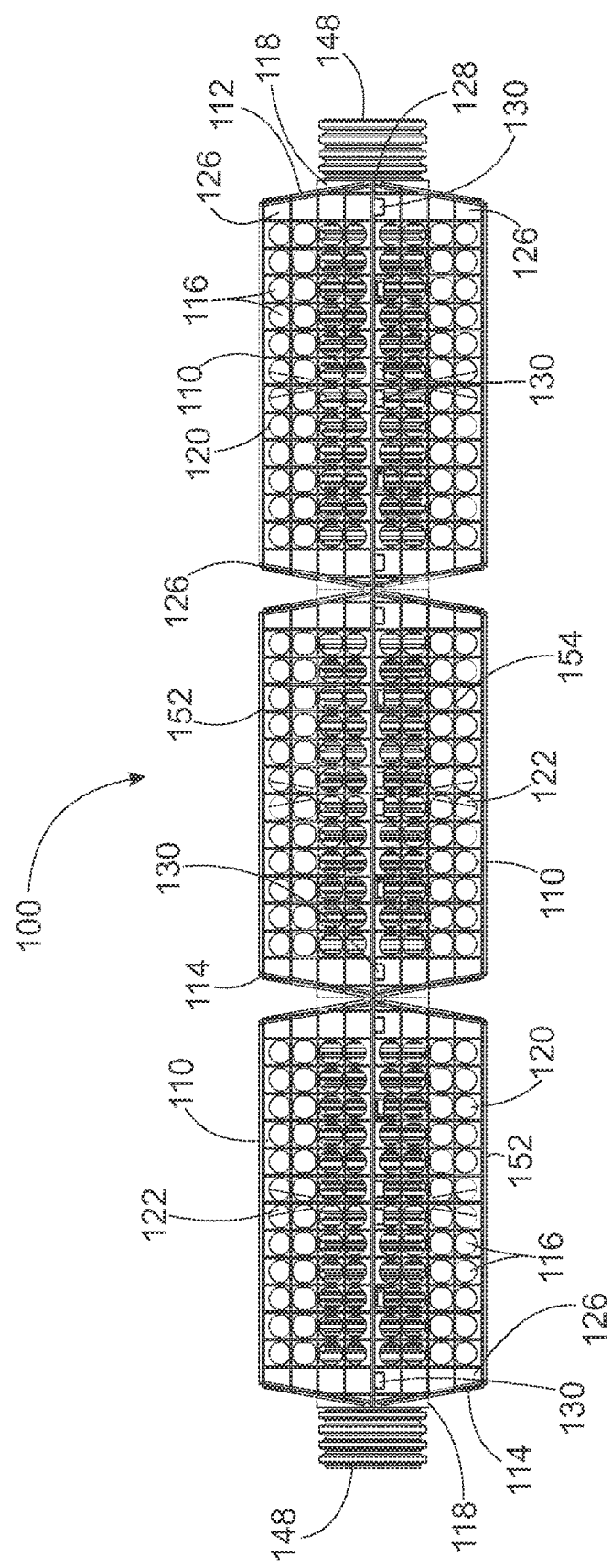
FIG. 22 is a side view of an aggregate replacement configured according to a thirteenth embodiment.
Figure 23:
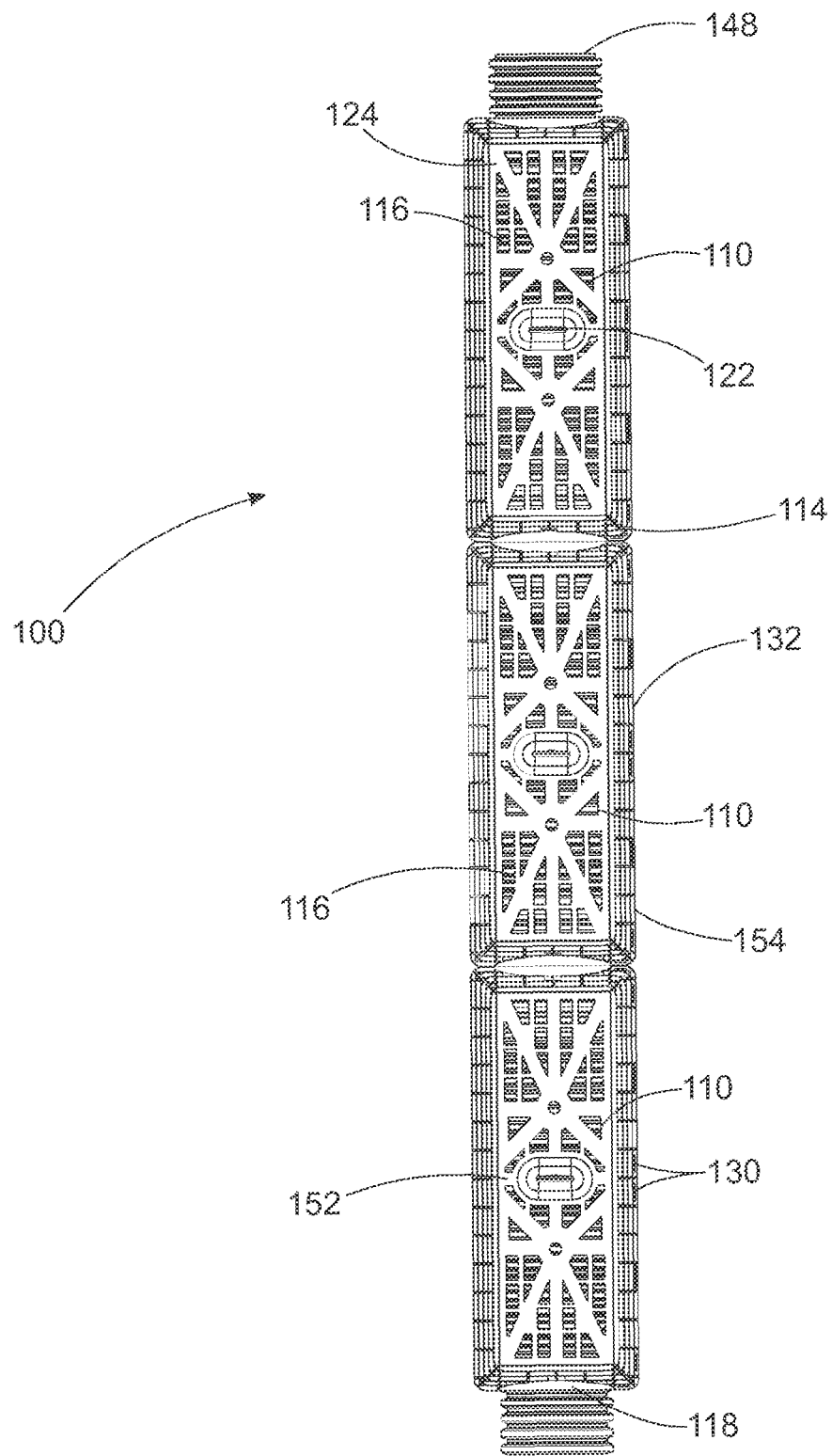
FIG. 23 is a top view of an aggregate replacement configured according to a thirteenth embodiment.

FIGS. 21-30 illustrate an additional embodiment of an aggregate replacement 100. In FIGS. 21-23, the aggregate replacement 100 is illustrated as being formed from multiple aggregate replacement units 110 which are positioned adjacent or abutting one another along a length of pipe 148. Each aggregate replacement unit 110 as illustrated in previous embodiments is a box like structure with a primarily empty interior for moisture to travel through. In addition to the arrangement illustrated in the figures, the units 110 may be spaced out along the length of the pipe 148.

Figure 24:
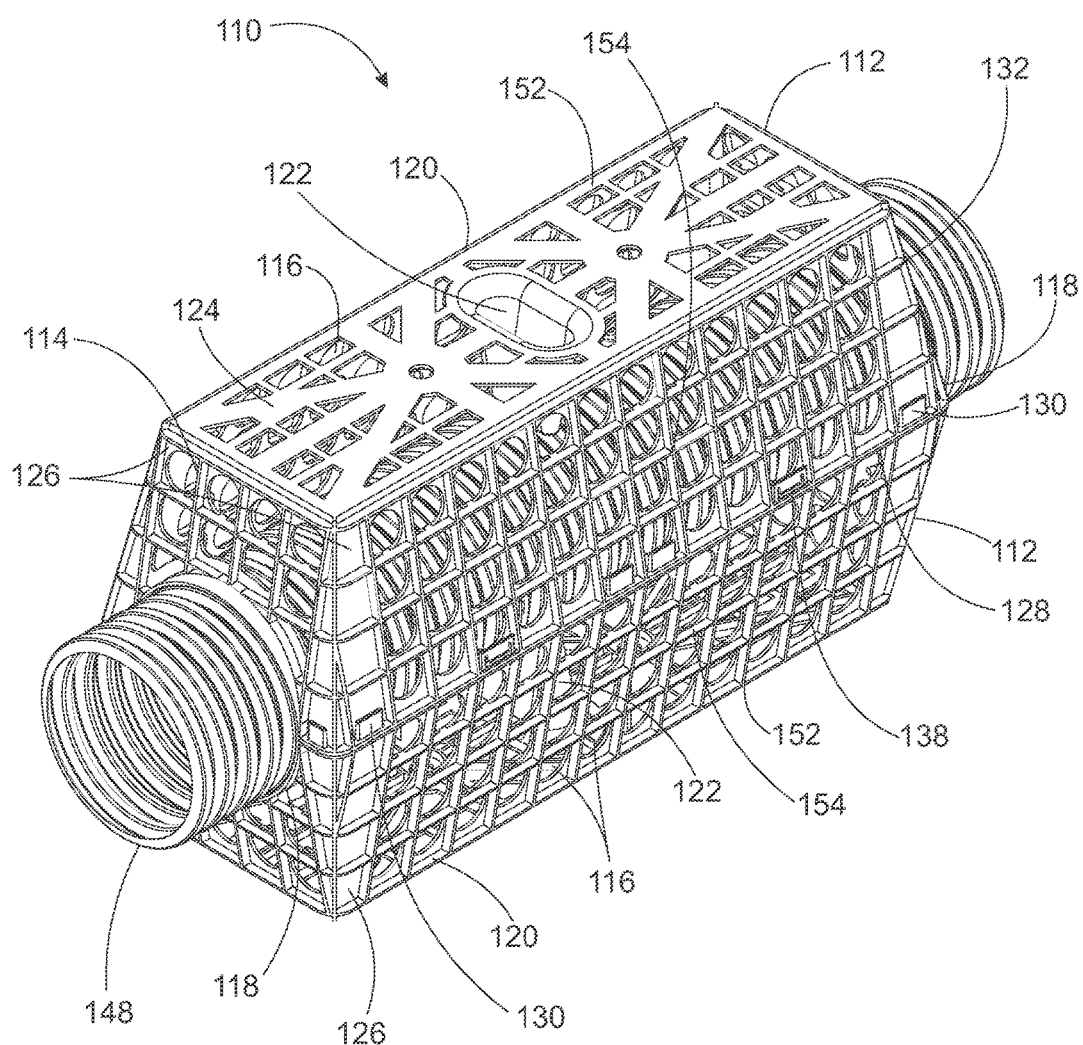
FIG. 24 is an isometric view of a single unit of aggregate replacement configured according to a thirteenth embodiment.
Figure 25:
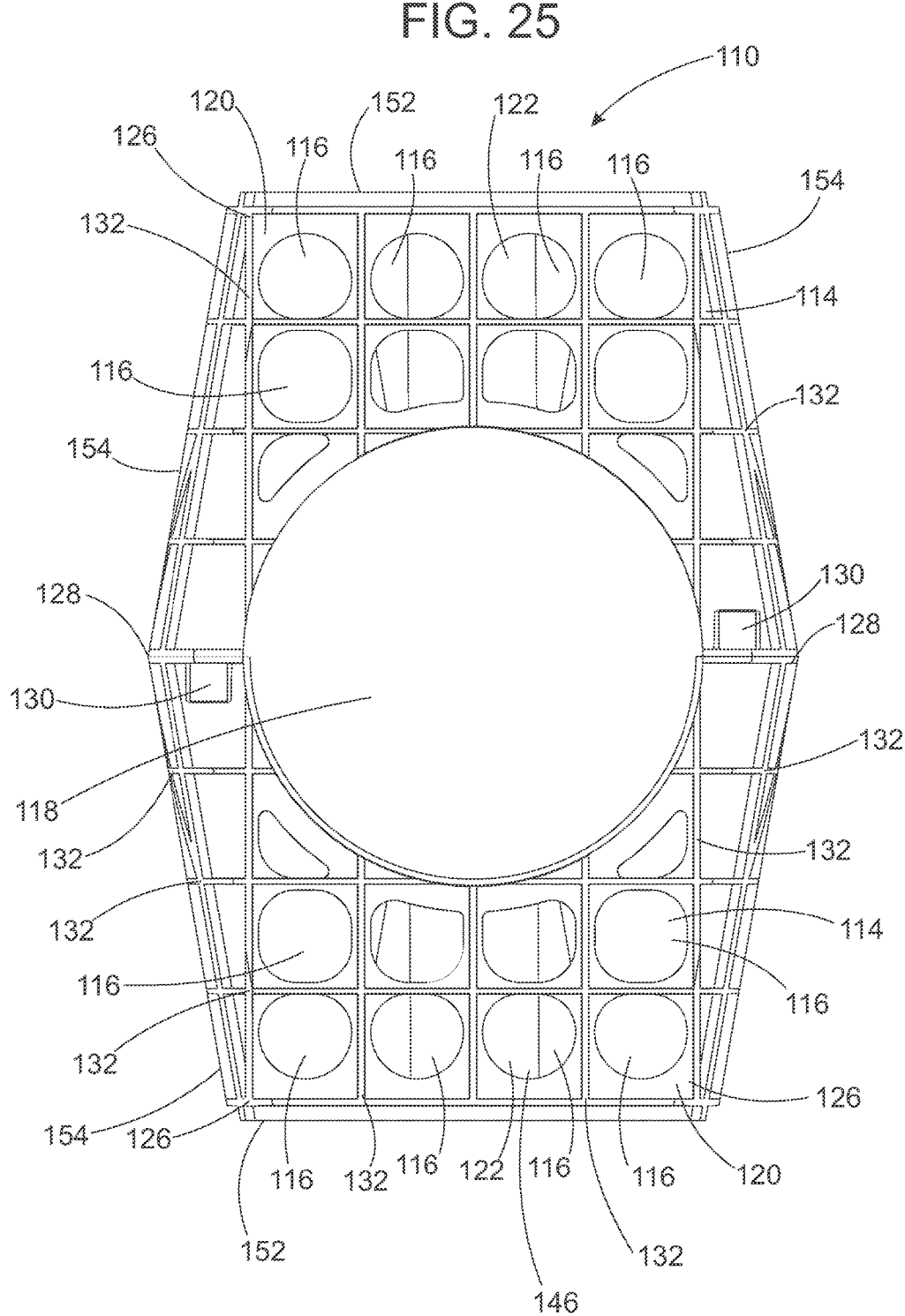
FIG. 25 is an end view of a single unit of an aggregate replacement configured according to a thirteenth embodiment.
Figure 26:
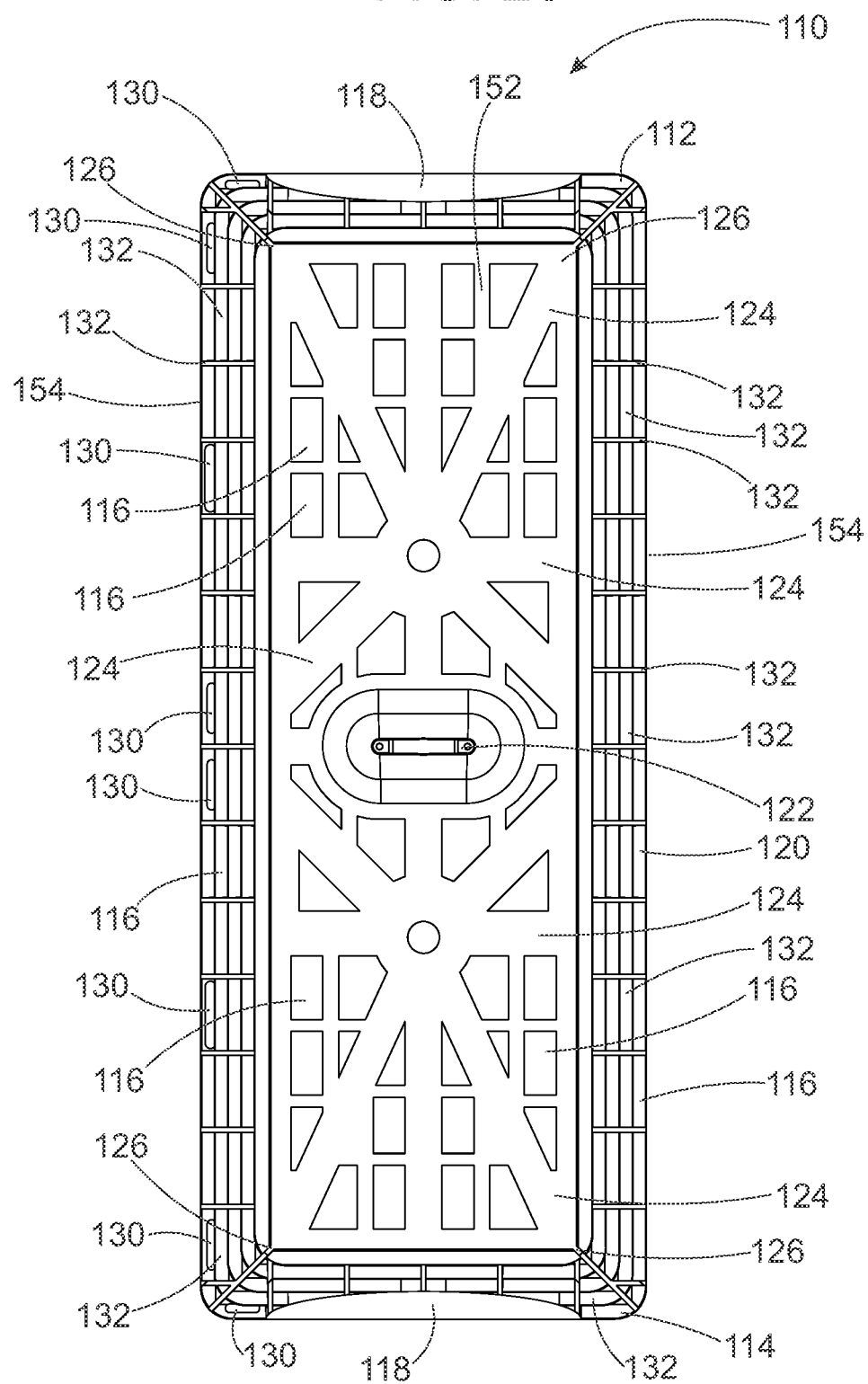
FIG. 26 is a top view of a single unit of an aggregate replacement configured according to a thirteenth embodiment.

FIGS. 24-26 illustrate a single unit 110 of aggregate replacement. The single unit 110 is illustrated as a closed box with a piece of pipe 148 which passes from one side of the aggregate replacement unit 110 through the interior of the unit 110 and out through the other side. A unit 110 is formed from two sections 120 of aggregate replacement. Each of the sections 120 is a box with an open top. Two or more sections 120, depending on the configuration, are coupled together around a length of perforated pipe 148 in order to form the boxlike unit 110.

Each section 120 of aggregate replacement has a proximal face or end 114 and a distal face or end 112 which are thin straight planar surfaces or faces that are located at each of the ends of the unit 110.

The proximal and distal faces or ends 114 and 112 are thin straight planar surfaces or faces that are used to form the structure or section 120. The proximal and distal faces 114 and 112, as illustrated, are trapezoidal shaped members which are angled slightly from perpendicular with the ground. In previous embodiments, the proximal and distal faces 114 and 112 were square or rectangular, however, in this embodiment the sides of the aggregate replacement sections 120 are angled slightly in order to allow the sections 120 to be stacked for shipping or storage. This angle 126 changes the shape of the proximal and distal faces 114 and 112 from rectangular to trapezoidal.

The proximal and distal faces 114 and 112, as discussed previously, however, may be formed in any shape or size desired. The proximal and distal faces 114 and 112 may be a thin straight planar surface or they may be curved. Additionally the proximal and distal faces 114 and 112 may be formed from a single solid surface or they may have a plurality of openings 116 as illustrated in the figures.

The proximal and distal faces 114 and 112 are both coupled to a bottom face 152. The bottom face 152 could also be considered a top or top face depending on the orientation of the section 120. The bottom face 152 is a rectangular surface that runs the length of the section 120. The bottom face 152 may be a solid planar surface or it may, as illustrated, have multiple openings 116 to allow liquid or moisture to pass through the surface into the interior of the aggregate replacement unit 110.

The bottom face 152 may be rectangular as illustrated or may be round, triangular, square or the like, provided the bottom face 152 serves the purpose of providing support to the remainder of the aggregate replacement unit 110.

At least two other sides 154 are coupled to the bottom face 152 between the proximal face 114 and the distal face 112. The sides 154 are also faces similar to the proximal and distal face 114 and 112 and the bottom face 152. The sides or side faces 154 are illustrated as trapezoidal planar surfaces that are coupled to the proximal face 114 on a proximal side or edge and the distal face 112 on a distal side or edge. The bottom face 152 is coupled to one of the remaining two side edges of the side face 154.

There are at least two side faces 154. One located on each of the lengths of the section 120. The two side faces 154, though illustrated as, trapezoidal surfaces may be rectangular, square, round, triangular or the like. The side faces 154 may be a thin straight planar surface or they may be curved or angled depending on the desire of the user.

A plurality of openings 116 are formed in the proximal face 114, distal face 112, bottom face 152 and side faces 154 of the aggregate replacement section 120. The openings 116 may be circular, triangular, square, trapezoidal, hexagonal, pentagonal or the like or other shaped openings cut or otherwise formed into the surface of the aggregate replacement section 120 in order to allow moisture such as water to travel through the faces of the aggregate replacement section 120 to the interior of the unit 110. The openings 116 may be sized as illustrated or the openings 116 may be smaller and formed as a mesh or the like.

As illustrated, it is likely desirable that the proximal face 114, distal face 112, side faces 154 and bottom face 152 are formed as unitary structures with the openings 116 formed therein.

Additional to the plurality of openings 116 formed in the faces of the aggregate replacement unit 110, strengthening members 124 are coupled to or formed in the bottom face 152 of the section 120. The strengthening members 124 as illustrated are thicker sections of material which are used to increase the strength and durability of the bottom face 152. The bottom face 152 of the unit 110 usually has the weight of soil placed on top of it. Additionally people may walk, drive or the like over the top of the unit 110 once it has been installed, therefore, it is important that the bottom face 152 can withstand the weight of use without collapsing. Additional strengthening members 124 may be used to increase the strength in the bottom face 152 without adding a lot of thickness to the bottom face 152. The strengthening members 124 as illustrated in the figure are formed in a sun shape with a circular member in the middle and other strengthening members 124 radiating out from it. While the illustrated arrangement of strengthening members 124 is an example of a system of strengthening members 124 that can provide the necessary strength to the unit 110, alternative arrangements of the strengthening members 124 also exist.

Additional strengthening members 124 may also be arranged vertically or horizontally along the side faces 154, proximal face 114 and distal face 112.

Other strengthening or raised ribs 132 are also formed in the side faces 154, proximal face 114, distal face 112 and bottom face 152. The raised ribs 132 are thicker sections of material that cross between the openings 116 in the surfaces of the faces. The raised ribs 132 add strength to the side faces 154, proximal face 114, distal face 112 and bottom face 152 of the sections 120 without adding substantial thickness or weight to the unit 110. The raised ribs 132 are illustrated as being organized in a grid shape, however, the raised ribs 132 may be arranged in any shape desired that provides the necessary strength to withstand the stresses of use after installation.

The side faces 154, the distal face 112 and the proximal face 114 are all coupled to the bottom face 152 at an angle other than 90 degrees. The side faces 154, distal face 112 and proximal face 114 are not perpendicular to the bottom face 152 in this embodiment. Instead, the side faces 154, distal face 112 and proximal face 114 are coupled to the bottom face 152 at an obtuse angle 126. The side faces 154, distal face 112 and proximal face 114 are all coupled to the bottom face with a draft angle or an angle beyond perpendicular. This draft angle will likely fall in the range of 3 degrees to 15 degrees making the obtuse angle 126 formed by the side faces 154, distal face 112, and proximal face 114 with the bottom face 152 in the range of 93 degrees to 105 degrees.

The obtuse angle 126 allows sections 120 of aggregate replacement to be stackable within each other. The ability to stack the sections 120 allows for easier and less expensive transportation of the sections 120. Additionally, more sections 120 of the aggregate replacement 100 may be stored in a smaller space, thereby saving money on the storage of excess aggregate replacement 100.

The aggregate replacement section 120 also has a mostly smooth interior surface which also aids in the stacking of the sections 120. The mostly smooth interior surface of the sections 120 prevents the sections 120 from getting caught on each other when they are being stacked or unstacked.

Additionally, the obtuse angles 126 formed between the proximal face 114, distal face 112, side faces 154 and the bottom face 152 cause a fully assembled aggregate replacement unit 110 to have a hexagonal structure. Cross sections of the aggregate replacement unit 110 taken along both the length and the width display the hexagonal structure of the unit 110. This hexagonal structure creates increased strength in the unit 110 causing it to resist many of the forces that will be applied on the unit 110 both during and after installation.

The two sections 120 are coupled together at joint 128. Joint 128 is formed by side edges of the two faces 154 abutting each other. The two sections 120 are coupled together at joint 128 by couplers 130.

Couplers 130 may be any type of coupler desired. Couplers 130 may be male/female connectors, pin connectors, clasps, clamps, screws or the like. Couplers 130 may be any type of couplers 130 that are easy to connect and which make it easy for the two sections 120 to be put into place on top of each other.

When the two sections 120 are coupled as in FIG. 24, an opening 118 is formed in the distal and proximal ends of the aggregate replacement unit 110. The openings 118 are pipe openings configured to contain a perforated pipe 148. The perforated pipe 148 passes through the proximal end of the unit 110, through the interior of the unit 110 and then out through the distal end of the unit 110.

Figure 27:
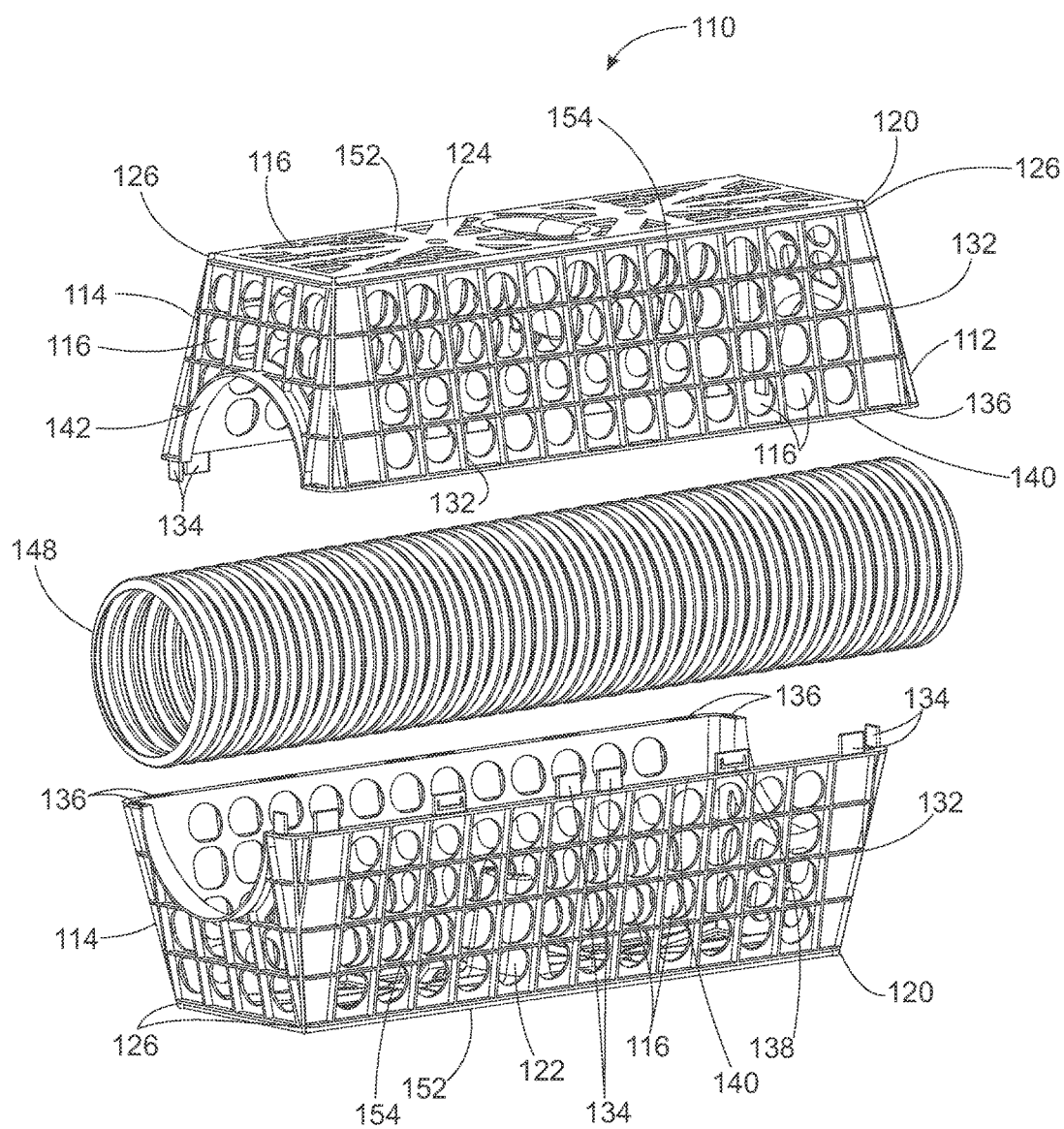
FIG. 27 is an exploded isometric view of a single unit of an aggregate replacement configured according to a thirteenth embodiment.

FIG. 27 illustrates an aggregate replacement unit 110 with a pipe 148 installed in an exploded view. In the exploded view, the joint 128 which separated the two sections 120 in the previous depictions is illustrated as two lips or edges 140 of the side faces 154. Both of the side faces 154 and the distal face 112 and proximal face 114 have a lip or edge 140 which when the aggregate replacement unit 110 is assembled abuts the edge 140 of a top or bottom section 120. The edges 140 on the side faces 154, proximal face 114 and distal face 112 are parallel to the bottom face 152 of the section 120. Due to the fact that the side faces 154, proximal face 114 and distal face 112 are coupled to the bottom face 152 at an angle greater than perpendicular or an obtuse angle 126, the edge 140 must be formed at angle in order to be parallel to the bottom face 152. Therefore, the edges 140 of the side faces 154, proximal face 114 and distal face 112 are not perpendicular to the surface of the respective faces.

Along the edge 140 of the side faces 154, proximal face 114 and distal face 112, the couplers 130 are illustrated as separate male 134 and female 136 members. The male member 134 is mated with the female member 136 in order to couple the two sections 120 together. The male members 134 are illustrated as tabs extending from half of the edge 140 of the section 120. The other half of the edge of the section 120 has female members 136 formed in it. This allows two identical sections 120 to be mated by flipping them so that the open surface of each section 120 abuts.

The male coupling member 134 though illustrated as a tab may be a pin, extrusion or the like.

The female coupling member 136 is illustrated as a slot formed in or along the edge 140 of half of the section 120. The female coupling member 136 is configured to be receive the male coupling member 134 when the two sections 120 abut.

While a male coupling member 134 and female coupling member 136 are illustrated in the figures, any type of coupling system that allows the two sections 120 of the unit 110 to be coupled together for installation may be used.

In addition to the coupling system, a locking mechanism 138 is illustrated. The locking mechanism 138 is illustrated as a raised area on some of the male coupling members 134. The locking mechanism 138 may be a slightly raised wedge shape of material, which when inserted into the female coupling member 136 catches on a lip in or under the female coupling member 136 thereby preventing the male coupling member 134 from being unintentionally removed from the female coupling member 136 and thereby locking the two sections 120 together. The locking mechanism 138 may also be a protrusion of any shape or size desired.

Alternate embodiments of a locking mechanism 138 may include a latching member that fits over a lip on both sections 120 of the unit 110. Other embodiments could include a screw or bolt which is secured through both sections 120 of the unit 110 or the like.

The edge 140 on the section 120 of aggregate replacement surrounds a mating opening 150. This opening 150 coincides with an identical opening 150 in another section 120 of aggregate replacement. When two mating openings 150 on two different sections 120 are placed in abutment, a unit 110 of aggregate replacement is formed which allows fluid to freely flow from one section 120 to the other.

An additional opening or cutout in the distal face 112 and proximal face 114 of the section 120 is configured to receive a section of pipe 148. The pipe cutout 142 is a semi-circle formed in the proximal face 114 and distal face 112 of a section 120. When two sections 120 are coupled together, the pipe cutouts 142 form a circular opening through which the pipe 148 passes.

Prior to coupling the two sections 120 together, the pipe 148 is placed in the pipe cutouts 142 of one section 120. Then the second section 120 is placed on top of the pipe 148.

The pipe cutout 142 may simply be a cutout or opening formed in the proximal face 114 and distal face 112 of the section 120 or the pipe cutout 142 may have a lip as illustrated. The lip may provide added strength to the unit 110 and additional support to the pipe 148.

Figure 28:
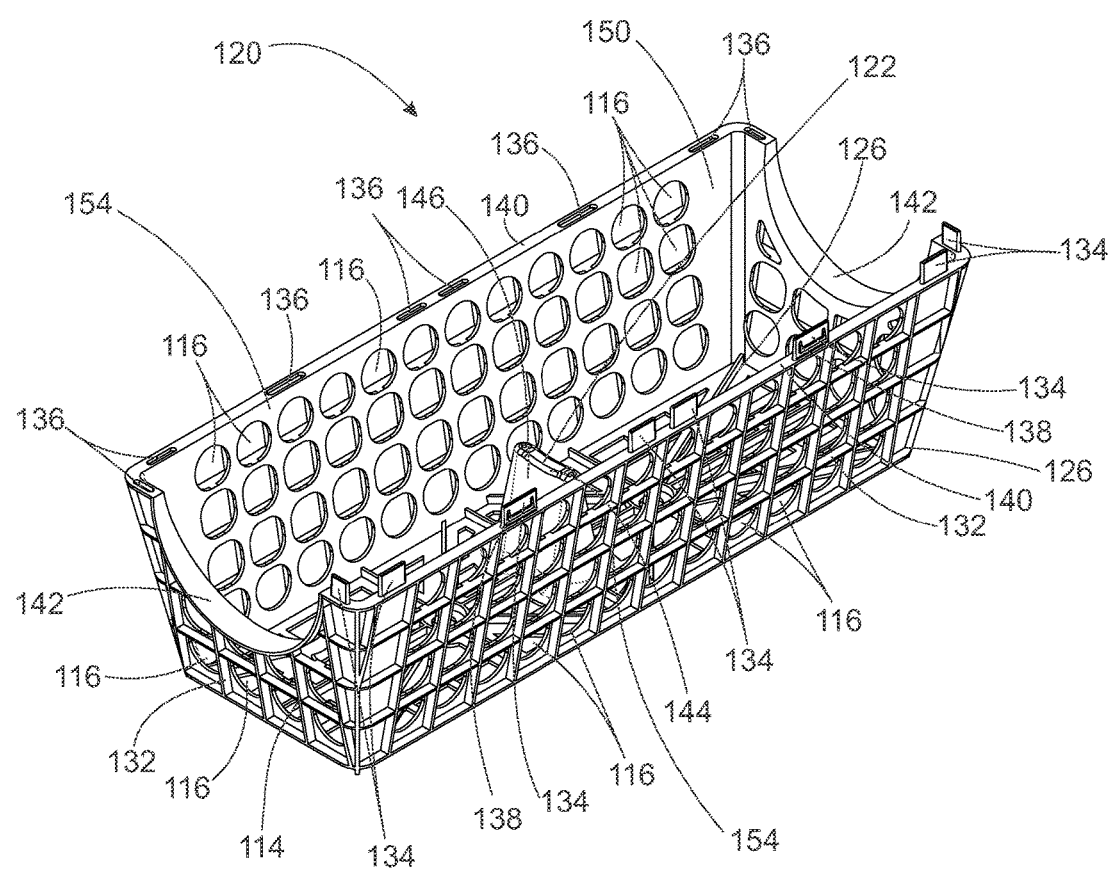
FIG. 28 is an isometric view of a section of an aggregate replacement configured according to a thirteenth embodiment.
Figure 29:
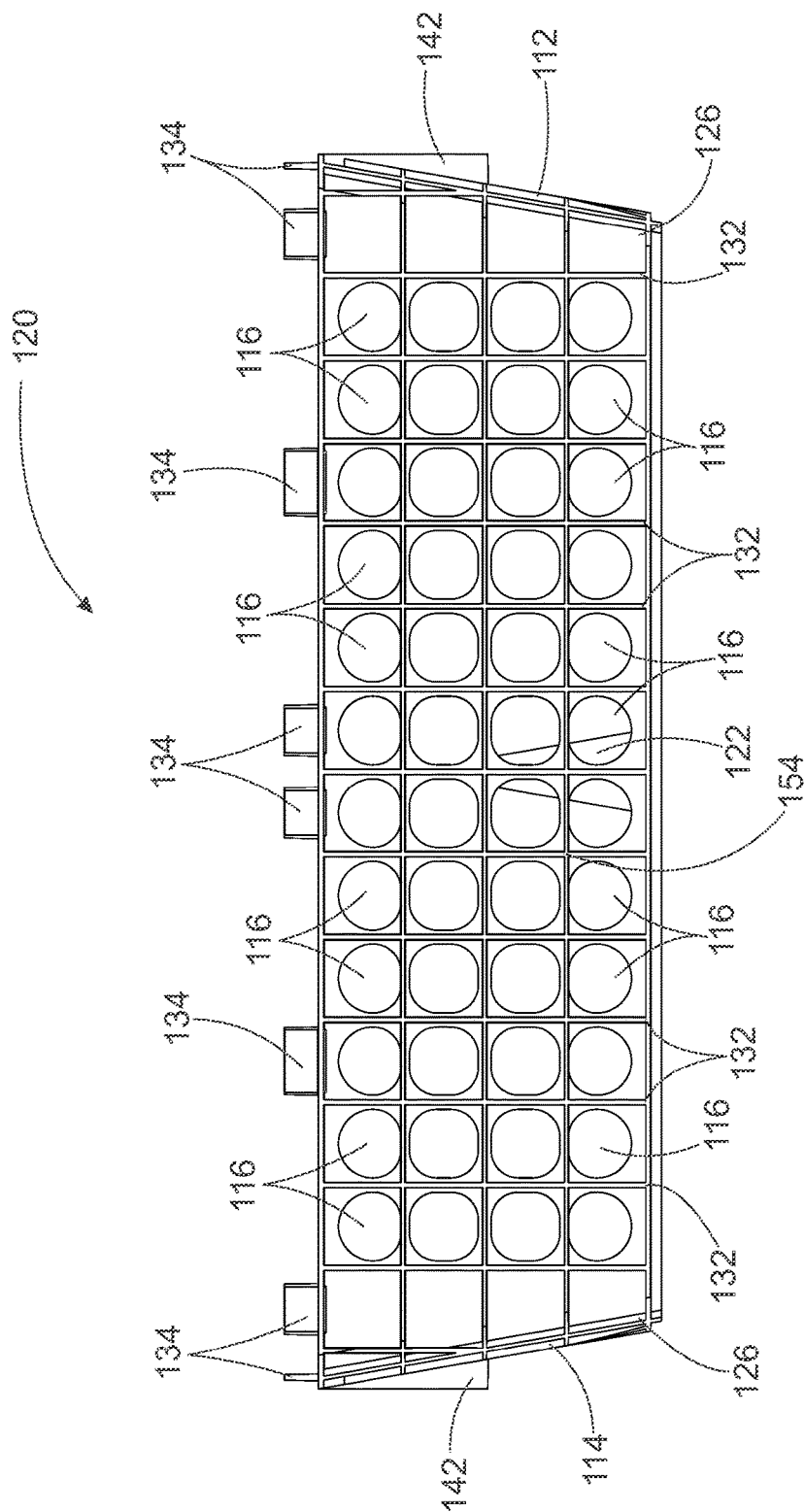
FIG. 29 is a side view of a section of an aggregate replacement configured according to a thirteenth embodiment.
Figure 30:
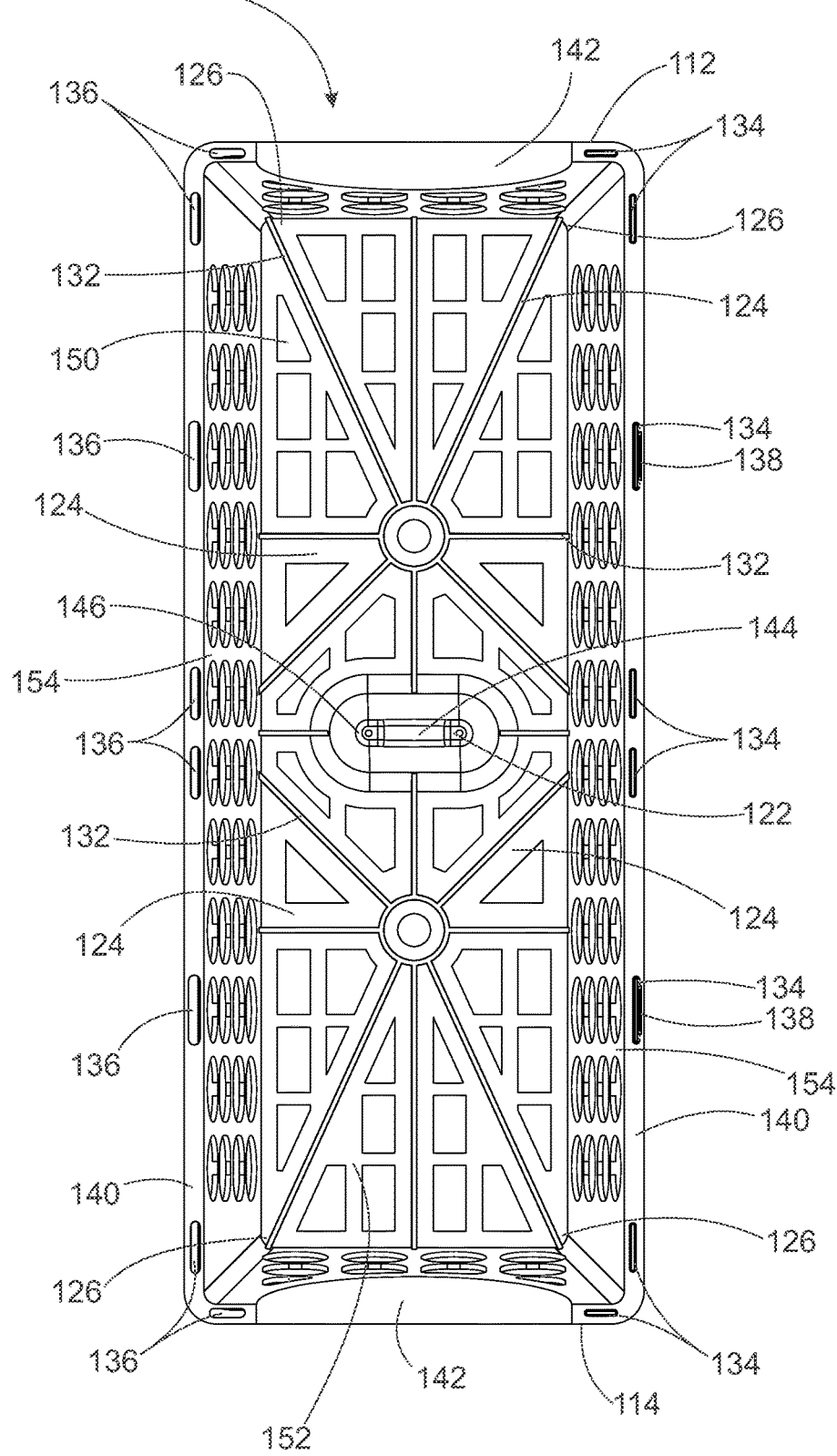
FIG. 30 is an inside view of a section of an aggregate replacement configured according to a thirteenth embodiment.

FIGS. 28-30 illustrate views of a section 120 of an aggregate replacement unit 110. In FIGS. 28 and 30 in particular, the interior of the section 120 is visible. A pipe support 122 is coupled in the center or a centrical location on the bottom face 152 of the section 120 opposite the mating opening 150. The pipe support 122 is a protrusion that extends from the bottom face 152 of the section 120 to provide added support to the pipe 148 to prevent it from sagging or the like. The pipe support 122 includes a support member 146. The support member 146 extends from the bottom face 152 to a support surface 144 which is a curved surface that abuts a portion of the pipe 148.

The support member 146, as illustrated, is a hollow member that tapers as it approaches the support surface. The support member 146 should be tall enough to support the pipe 148 in a mostly horizontal position. By forming the support member 146 as a hollow tapered protrusion, a support member 146 on a second section 120 may be inserted into the bottom underside of the support member 146 when the sections 120 are stacked.

FIG. 26, which is a top view of a section, or a view from the underside of the bottom face 152, illustrates the underside of the pipe support 122. The hollow interior of the pipe support 122 is illustrated. When multiple sections 120 are stacked for storage the pipe supports 122 on each succeeding section 120 fits inside the pipe support 122 on the previous section 120, thereby allowing the sections 120 to be stacked more compactly than if a solid pipe support 122 was used.

FIG. 28 illustrates the support surface 144 which is a slightly curved top to the pipe support 122. The support surface 144 is configured to provide support to the pipe 148 while taking up very little room and contacting a fraction of the surface of the diameter of the pipe 148. In some configurations, the support surface 144 may contact fifty percent or less of the surface of the diameter of the pipe 148. In other configurations, the support surface 144 may contact less than a third or thirty-three percent of the surface of the diameter of the pipe 148, thereby allowing the pipe support 122 to take up very little space within the unit 110.

Due to the fact that both sections 120 of the unit 110 are identical, a pipe support 122 will be located both above and below the pipe 148 in a unit 110. While the lower pipe support 122 helps to support the pipe 148, the upper pipe support 122 helps to support the top or upper bottom surface 152 of the unit 110, thereby providing added strength and stability to the entire unit 110.

In alternate embodiments, however, a solid or non-hollow pipe support 122 may be used instead of the hollow pipe support 122 illustrated. When a solid pipe support 122 is used the stacked sections 120 will have an empty space between each section 120 for the pipe support 122. Therefore, sections 120 with a solid pipe support 122 cannot be stacked as tightly as sections 120 with a hollow pipe support 122 as illustrated.

When in use the aggregate replacement 100 is installed similarly to FIG. 21. First a trench is excavated. The trench is lined with filter fabric. Then a row of sections 120 of aggregate replacement 100 are placed in the bottom of the trench with the mating opening 150 facing up. The sections 120 may be placed abutting each other or they may be spaced out. A pipe 184 is then placed in the pipe cutouts 142 in the distal face 112 and proximal face 114 of the section 120. The pipe 184 is also placed on the pipe support 122. Other sections 120 are then coupled and locked into position on top of the sections 120 in the trench. The top sections 120 are flipped over so that the mating openings 150 on the top sections 120 are adjacent the mating openings 150 on the bottom sections 120. Once the aggregate replacement 100 has been assembled, the filter fabric is wrapped around the aggregate replacement and the trench is filled in with dirt.

Additional embodiments of the aggregate replacement may be used as a radon evacuation system. In embodiments configured for radon evacuation, an additional upward means connects the aggregate replacement to a conduit for discharge of the radon gas into the air away from any structures.

Figure 31:
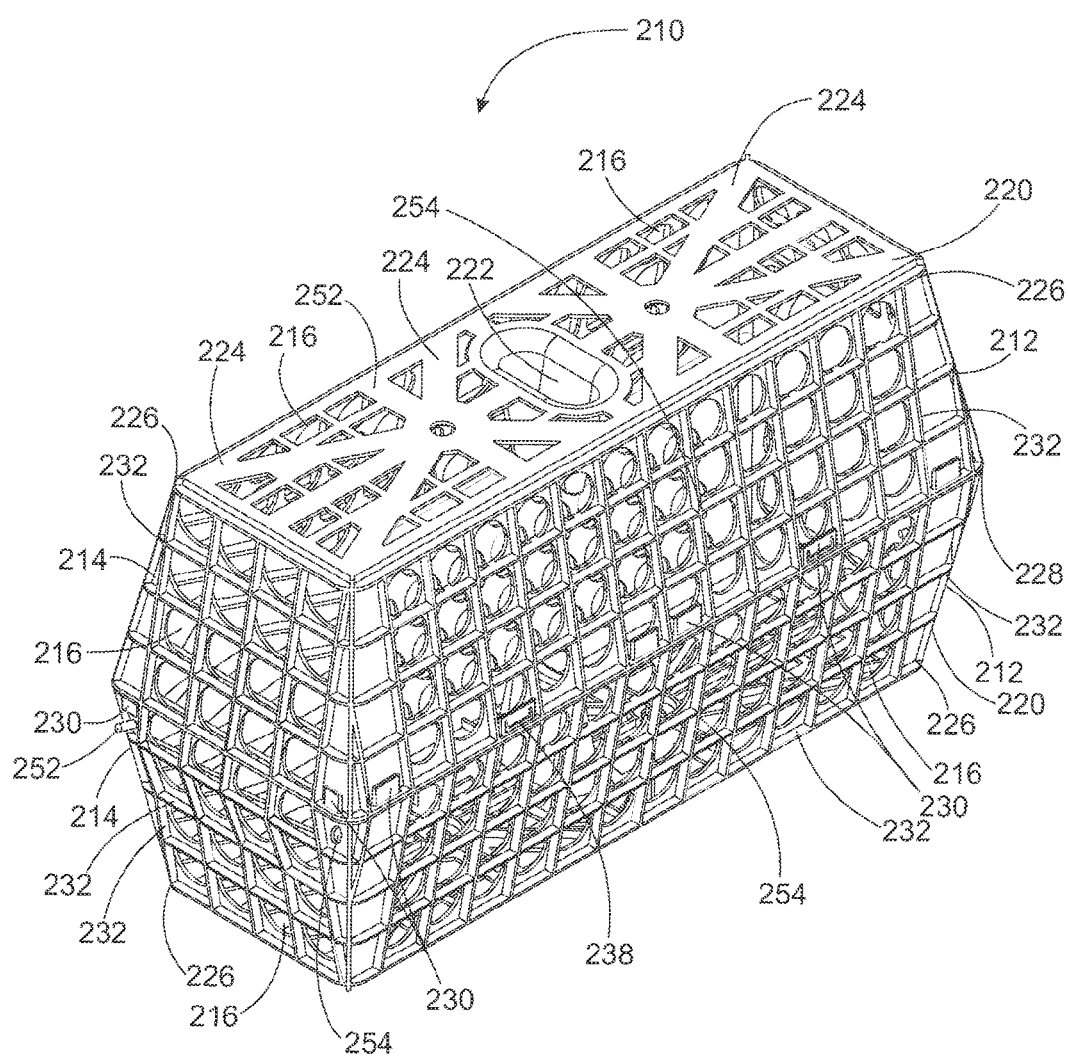
FIG. 31 is an isometric view of a pipe-less aggregate replacement.
Figure 32:
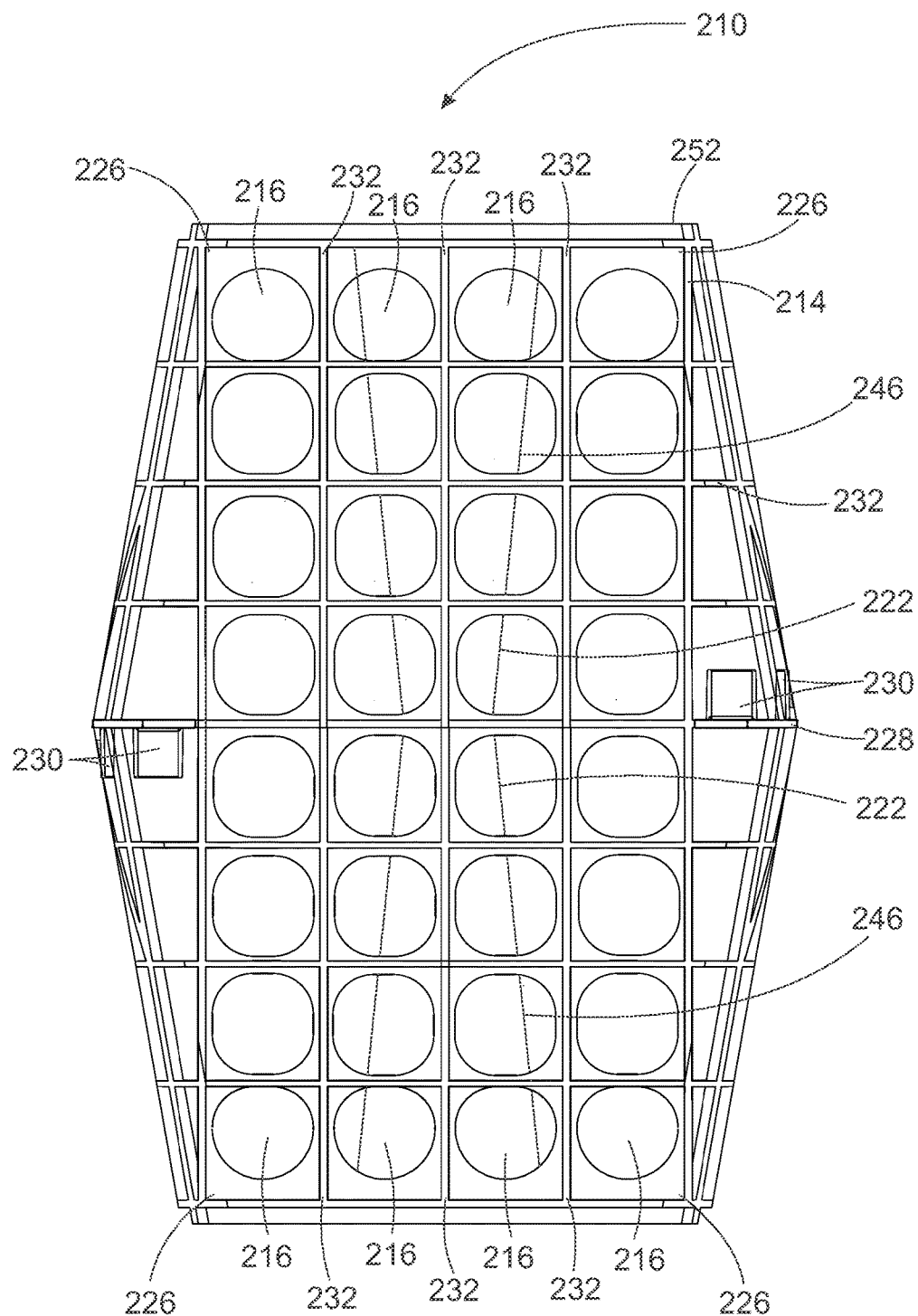
FIG. 32 is an end view of a pipe-less aggregate replacement.

FIGS. 31-33 illustrate a pipe-less unit configured similarly to the embodiment just disclosed. The pipe-less unit 210 is also illustrated as a closed box. A pipe-less unit 210 is formed from two sections 220 of pipe-less aggregate replacement. Each of the sections 220 is a box with an open top. Two or more sections 220, depending on the configuration, are snapped or coupled together in order to form the boxlike unit 210.

Each section 220 of pipe-less aggregate replacement has a proximal face or end 214 and a distal face or end 212 which are thin planar surfaces or faces that are located at each of the ends of the section 220.

The proximal and distal faces or ends 214 and 212 are thin planar surfaces or faces that are used to form the structure or section 220. The proximal and distal faces 214 and 212, as illustrated, are trapezoidal shaped members which are angled slightly from perpendicular with the ground. In previous embodiments, the proximal and distal faces 214 and 212 were square or rectangular, however, in this embodiment the sides of the aggregate replacement sections 220 are angled slightly in order to allow the sections 220 to be stacked for shipping or storage. This angle 226 changes the shape of the proximal and distal faces 214 and 212 from rectangular to trapezoidal.

The proximal and distal faces 214 and 212, as discussed previously, however, may be formed in any shape or size desired. The proximal and distal faces 214 and 212 may be thin straight planar surfaces or they may be curved. Additionally the proximal and distal faces 214 and 212 may be formed from a single solid surface or it may have a plurality of openings 216 as illustrated in the figures.

The proximal and distal faces 214 and 212 are both coupled to a bottom face 252. The bottom face 252 could also be considered a top or top face depending on the orientation of the section 220. The bottom face 252 is a rectangular surface that runs the length of the section 220. The bottom face 252 may be a solid planar surface or it may, as illustrated, have multiple openings 216 to allow liquid or moisture to pass through the surface into the interior of the pipe-less aggregate replacement unit 210.

The bottom face 252 may be rectangular as illustrated or may be round, triangular, square or the like, provided the bottom face 252 serves the purpose of providing support to the remainder of the pipe-less aggregate replacement unit 210.

At least two other sides 254 are coupled to the bottom face 252 between the proximal face 214 and the distal face 212. The sides 254 are also faces similar to the proximal and distal face 214 and 212 and the bottom face 252. The sides or side faces 254 are illustrated as trapezoidal planar surfaces that are coupled to the proximal face 214 on a proximal side or edge and the distal face 212 on a distal side or edge. The bottom face 252 is coupled to one of the remaining two side edges of the side face 254.

There are at least two side faces 254. One located on each of the lengths of the section 220. The two side faces 254, though illustrated as, trapezoidal surfaces may be rectangular, square, round, triangular or the like. The side faces 254 may be thin straight planar surfaces, curved or angled depending on the desire of the user.

A plurality of openings 216 are formed in the proximal face 214, distal face 212, bottom face 252 and side faces 254 of the pipe-less aggregate replacement section 220. The openings 216 may be circular, triangular, square, trapezoidal, hexagonal, pentagonal or the like or other shaped openings cut or otherwise formed into the surface of the aggregate replacement section 220 in order to allow moisture such as water to travel through the faces of the pipe-less aggregate replacement section 220 to the interior of the unit 210. The openings 216 may be formed in any size desired. The openings 216 may be sized as illustrated in the figures or the openings 216 in a smaller mesh-like configuration.

As illustrated, it is likely desirable that the proximal face 214, distal face 212, side faces 254 and bottom face 252 are formed as unitary structures with the openings 216 formed therein.

Additional to the plurality of openings 216 formed in the faces of the pipe-less aggregate replacement unit 210, strengthening members 224 are coupled to or formed in the bottom face 252 of the section 220. The strengthening members 224 as illustrated are thicker sections of material which are used to increase the strength and durability of the bottom face 252. The bottom face 252 of the unit 210 usually has the weight of soil placed on top of it. Additionally people may walk, drive or the like over the top of the unit 210 once it has been installed, therefore, it is important that the bottom face 252 can withstand the weight of use without collapsing. Therefore additional strengthening members 224 may be used to increase the strength in the bottom face 252 without adding substantial thickness to the bottom face 252. The strengthening members 224 as illustrated in the figure are formed in a sun shape with a circular member in the middle and other strengthening members 224 radiating out from it. While the illustrated arrangement of strengthening members 224 is an example of a system of strengthening members 224 that can provide the necessary strength to the unit 110, alternative arrangements of the strengthening members 224 also exist.

Additional strengthening members 224 may also be arranged vertically or on the side faces 254, proximal face 214 and distal face 212.

Other strengthening or raised ribs 232 are also formed in the side faces 254, bottom face 252, proximal face 214 and distal face 212. The raised ribs 232 are thicker sections of material that cross between the openings 216 in the surfaces of the faces. The raised ribs 232 add strength to the side faces 254, bottom face 252, proximal face 214 and distal face 212 of the sections 220 without adding substantial thickness or weight to the unit 210. The raised ribs 232 are illustrated as being organized in a grid shape, however, the raised ribs 232 may be arranged in any shape desired that provides the necessary strength to withstand the stresses of use after installation.

The side faces 254, the distal face 212 and the proximal face 214 are all coupled to the bottom face 252 at an angle other than 90 degrees. The side faces 254, distal face 212 and proximal face 214 are not perpendicular to the bottom face 252 in this embodiment. Instead, the side faces 254, distal face 212 and proximal face 214 are coupled to the bottom face 252 at an obtuse angle 226. The side faces 254, distal face 212 and proximal face 214 are all coupled to the bottom face at a draft angle or an angle beyond perpendicular. This draft angle will likely fall in the range of 3 degrees to 15 degrees making the obtuse angle 226 formed by the side faces 254, distal face 212, and proximal face 214 with the bottom face 252 in the range of 93 degrees to 105 degrees.

The obtuse angle 226 allows sections 220 of pipe-less aggregate replacement to be stackable within each other. The ability to stack the sections 220 allows for easier and less expensive transportation of the sections 220. Additionally, more sections 220 of the pipe-less aggregate replacement may be stored in a smaller space, thereby saving money on the storage of excess aggregate replacement.

The aggregate replacement section 220 also has a mostly smooth interior surface which also aids in the stacking of the sections 220. The mostly smooth interior surface of the sections 220 prevents the sections 220 from getting caught on each other when they are being stacked or unstacked.

Additionally, the obtuse angles 226 formed between the proximal face 214, distal face 212, side faces 254 and the bottom face 252 cause a fully assembled aggregate replacement unit 210 to have a hexagonal structure. Cross sections of the aggregate replacement unit 210 taken along both the length and the width display the hexagonal structure of the unit 210. This hexagonal structure creates increased strength in the unit 210 causing it to resist many of the forces that will be applied on the unit 210 both during and after installation.

The two sections 220 are coupled together at joint 228. Joint 228 is formed by side edges of the two faces 254 abutting each other. The two sections 220 are coupled together at joint 228 by couplers 230.

Couplers 230 may be any type of coupler desired. Couplers 230 may be male/female connectors, pin connectors, clasps, screws or the like. Provided the couplers 230 are easy to connect and make it easy for the two sections 220 to be put into place on top of each other.

In FIG. 33, the joint 228 which separated the two sections 220 in the previous depictions is illustrated as a lip or edge of the side faces 254. Both of the side faces 254 and the distal face 212 and proximal face 214 have a lip or edge 240 which when the pipe-less aggregate replacement unit 210 is assembled abuts the edge 240 of a top of bottom section 220. The edge 240 on the side faces 254, proximal face 214 and distal face 212 are parallel to the bottom face 252 of the section 220. Due to the fact that the side faces 254, proximal face 214 and distal face 212 are coupled to the bottom face 252 at an angle greater than perpendicular or an obtuse angle 226, the edge 240 must be formed at angle in order to be parallel to the bottom face 252. Therefore, the edge 240 of the side faces 254, proximal face 214 and distal face 212 are not perpendicular to the surface of the respective faces.

Along the edge 240 of the side faces 254, proximal face 214 and distal face 212, the couplers 230 are illustrated as separate male 234 and female 236 members in this figure. The male member 234 is mated with the female member 236 in order to couple the two sections 220 together. The male members 234 are illustrated as tabs extending from half of the edge 240 of the section 220. The other half of the edge of the section 220 has female members 236 formed in it. This allows two identical sections 220 to be mated by flipping them so that the open surface of each section 220 abuts.

The male coupling member 234 though illustrated as a tab may be a pin, extrusion or the like.

The female coupling member 236 is illustrated as a slot formed in or along the edge 240 of half of the section 220. The female coupling member 236 is configured to be receive the male coupling member 234 when the two sections 220 abut. The female coupling member 236 may also be formed in any size or shape desired, provided it serves the purpose to couple the two sections 220 of pipe-less aggregate replacement together.

While a male coupling member 234 and female coupling member 236 are illustrated in the figures, any type of coupling system that allows the two sections 220 of the unit 210 to be coupled together for installation may be used.

In addition to the coupling system, a locking mechanism 238 is illustrated. The locking mechanism 238 is illustrated as a raised area on some of the male coupling members 234. The locking mechanism 238 may be a slightly raised wedge shape of material, which when inserted into the female coupling member 236 catches on a lip in or under the female coupling member 236 thereby preventing the male coupling member 234 from being unintentionally removed from the female coupling member 236 and thereby locking the two sections 220 together. The locking mechanism 238 may also be a protrusion of any shape or size desired.

Alternate embodiments of a locking mechanism 238 may include a latching member that fits over a lip on both sections 220 of the unit 210. Other embodiments could include a screw or bolt which is secured through both sections 220 of the unit 210 or the like.

The edge 240 on the section 220 of pipe-less aggregate replacement surrounds a mating opening 250. This opening 250 coincides with an identical opening 250 in another section 220 of pipe-less aggregate replacement. When two mating openings 250 on two different sections 220 are placed in abutment, a unit 210 of pipe-less aggregate replacement is formed which allows fluid to freely flow from one section 220 to the other.

FIG. 33 illustrates an isometric view of a section 220 of a pipe-less aggregate replacement unit 210. In FIG. 33 the interior of the section 220 is visible. A support 222 is coupled in the center or a centrical location on the bottom face 252 of the section 220 opposite the mating opening 250. The support 222 is a protrusion that extends from the bottom face 252 of the section 220 to provide added support to the unit 210 to prevent it from sagging or the like. The support 222 includes a support member 246. The support member 246 extends from the bottom face 252 to a support surface 244 which abuts the support surface 244 of the support 222 in the section 220 which is positioned above or below the support surface 244. The supports 222 in the two sections 220 which are coupled together to form the unit 210 are positioned abutting or adjacent each other when the sections 220 are coupled together. The supports 220 add strength and support to the unit 210 and help to prevent it from collapsing when in use.

The support member 246, as illustrated, is a hollow member that tapers as it approaches the support surface 244. The support member 246 is as tall or almost as tall as the edge of the pipe-less aggregate replacement section 220. By forming the support member 246 as a hollow tapered protrusion, a support member 246 on a second section 220 may be inserted into the bottom underside of the support member 246 when the sections 220 are stacked for storage or shipping.

FIG. 31, which is an isometric view of a pipe-less unit 210, illustrates the underside of the support 222. The hollow interior of the support 222 is illustrated. When multiple sections 220 are stacked for storage the supports 222 on each succeeding section 220 fits inside the support 222 on the previous section 220, thereby allowing the sections 220 to be stacked more compactly than if a solid support 222 was used.

In alternate embodiments, however, a solid support 222 may be used instead of the hollow support 222 illustrated. When a solid support 222 is used the stacked sections 220 will have an empty space between each section 220 for the support 222. Therefore, sections 220 with a solid support 222 cannot be stacked as tightly as sections 220 with a hollow support 222 as illustrated.

In additional embodiments, pipe-less aggregate replacement units 210 may have couplers on the distal face 212 and proximal face 214 of the unit 210 in order to couple multiple units 210 together as the pipe-less units 210 do not have the pipe to hold them in place horizontally. FIG. 31 illustrates a male coupler 252 and a female coupler 254 formed or coupled to the proximal face 214 of the pipe-less aggregate unit 210. A similar arrangement of couplers would be formed on the distal face 212 allowing two pipe-less aggregate units 210 to be coupled adjacent each other.

Accordingly, for the exemplary purposes of this disclosure, the components defining any embodiment of the invention may be formed as one piece if it is possible for the components to still serve their function. The components may also be composed of any of many different types of materials or combinations thereof that can readily be formed into shaped objects provided that the components selected are consistent with the intended mechanical operation of the invention. For example, the components may be formed of rubbers (synthetic and/or natural), glasses, composites such as fiberglass, carbon-fiber and/or other like materials, polymers such as plastic, polycarbonate, PVC plastic, ABS plastic, polystyrene, polypropylene, acrylic, nylon, phenolic, any combination thereof, and/or other like materials, metals, such as zinc, magnesium, titanium, copper, iron, steel, stainless steel, any combination thereof, and/or other like materials, alloys, such as aluminum, and/or other like materials, any other suitable material, and/or any combination thereof.

The embodiments and examples set forth herein were presented in order to best explain the present invention and its practical applications and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, any components of the present invention indicated in the drawings or herein are given as an example of possible components and not as a limitation.

The invention claimed is:

1. An aggregate replacement device comprising:
a section having a proximal face, a distal face and at least one face;
a plurality of openings formed in said at least one face;
said at least one face having a proximal edge, a distal edge and two side edges;
wherein said proximal face is coupled to said proximal edge of said at least one face forming an obtuse angle between said proximal face and said at least one face;
wherein said distal face is coupled to said distal edge of said at least one face forming an obtuse angle between said distal face and said at least one face;
at least one coupler coupled to two of said two side edges of said at least one face for coupling said section to a second section; and
at least one pipe support coupled to one of said at least one face.

2. The aggregate replacement device of claim 1, wherein said section is configured to couple to said second section and form a hexagonal structure.

3. The aggregate replacement device of claim 1, wherein said at least one pipe support is hollow and configured to receive a second at least one pipe support interiorly.

4. The aggregate replacement device of claim 1, wherein said at least one pipe support abuts less than thirty-three percent of a diameter of a pipe.

5. The aggregate replacement device of claim 1, further comprising at least one locking mechanism coupled to at least one of said two side edges of said at least one face.

6. The aggregate replacement device of claim 1, wherein said section may be placed within a second section.

7. The aggregate replacement device of claim 1, wherein said two of said two side edges of said at least one face which are coupled to said at least one coupler are horizontal.

8. An aggregate replacement device comprising:
at least one structure having a proximal face, a distal face, at least one additional face and a mating opening;
a plurality of flow openings formed in said at least one additional face;
wherein said distal face is coupled to a distal end of said at least one additional face and said proximal face is coupled to a proximal end of said at least one additional face;
wherein said mating opening is formed between said proximal face and said distal face;
a support coupled to said at least one additional face at a location opposite said mating opening;
wherein said support is hollow and configured to receive a second support interiorly;
wherein said at least one structure is configured to couple to a second said at least one structure; and
wherein when said at least one structure is coupled to a second at least one structure, said mating opening of said at least one structure is adjacent said mating opening of said second at least one structure.

9. The aggregate replacement device of claim 8, wherein said support is coupled to said at least one additional face at a centrical location.

10. The aggregate replacement device of claim 8, wherein said support tapers.

11. The aggregate replacement device of claim 8, further comprising at least one locking device for locking said at least one structure to said second at least one structure.

12. The aggregate replacement device of claim 8, wherein said proximal face and said proximal end of said at least one additional face are coupled to form an obtuse angle.

13. An aggregate replacement device comprising:
a structure having a proximal face, a distal face, a bottom face and two side faces;
said two side faces and said bottom face having a plurality of openings;
said two side faces and said bottom face each further comprising a proximal edge, a distal edge and two side edges;
said proximal face coupled to each of said proximal edges of said two side faces and said bottom face;
said distal face coupled to each of said distal edges of said two side faces and said bottom face;
a first of said two side edges of each of said two side faces is coupled to one of said two side edges of said bottom face;
at least one coupler coupled to a second of said two side edges of each of said two side faces;
wherein said proximal face, said distal face and said two side faces are coupled to said bottom face to form an obtuse angle;
at least one locking device coupled to said second of said two side edges of each of said two side faces;
said at least one coupler configured to couple said structure to a second structure with said second of said two side edges of each of said two side faces abutting on each of said structure and said second structure; and said at least one locking device configured to lock said structure to said second structure.

14. The aggregate replacement device of claim 13, further comprising a support coupled to said bottom face.

15. The aggregate replacement device of claim 14, wherein said support is hollow and configured to receive a second support interiorly.

16. The aggregate replacement device of claim 15, wherein said support tapers from a bottom at said bottom face to a top.

17. The aggregate replacement device of claim 14, further comprising:

a pipe receiver cutout formed in said proximal face and said distal face;

said proximal face and said distal face being configured to receive a pipe through an interior of said structure;

wherein said support being configured to support said pipe in said interior of said structure; and wherein said structure is configured to receive said pipe prior to said structure being coupled to said second structure.

\* \* \* \* \*